US012755180B2

(12) United States Patent
Wang et al.

(10) Patent No.: US 12,755,180 B2
(45) Date of Patent: Oct. 6, 2026

(54) QUANTUM MIXER TO SENSE ARBITRARY-FREQUENCY FIELDS

(71) Applicant: Massachusetts Institute of Technology, Cambridge, MA (US)

(72) Inventors: Guoqing Wang, Cambridge, MA (US); Yixiang Liu, Cambridge, MA (US); Jennifer Schloss, Cambridge, MA (US); Scott Alsid, Cambridge, MA (US); Danielle A. Braje, Winchester, MA (US); Paola Cappellaro, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 859 days.

(21) Appl. No.: 18/193,730

(22) Filed: Mar. 31, 2023

(65) Prior Publication Data

US 2024/0135224 A1 Apr. 25, 2024

Related U.S. Application Data

(60) Provisional application No. 63/325,929, filed on Mar. 31, 2022.

(51) Int. Cl.
*G06N 10/40* (2022.01)
*H04B 10/70* (2013.01)

(52) U.S. Cl.
CPC ............ *G06N 10/40* (2022.01); *H04B 10/70* (2013.01)

(58) Field of Classification Search
CPC ............................... G06N 10/40; H04B 10/70
See application file for complete search history.

(56) References Cited

U.S. PATENT DOCUMENTS

| | | | | |
|---|---|---|---|---|
| 2019/0317173 A1* | 10/2019 | Connolly | ............... | G01R 33/00 |
| 2021/0080517 A1* | 3/2021 | Hart | ....................... | B82Y 20/00 |
| 2022/0156620 A1* | 5/2022 | McDermott, III | ..... | G06N 10/00 |

OTHER PUBLICATIONS

Abdumalikov et al. "Experimental realization of non-Abelian non-adiabatic geometric gates." Nature 496.7446 (2013): 482-485.

(Continued)

*Primary Examiner* — Sanchita Roy
(74) *Attorney, Agent, or Firm* — Smith Baluch LLP

(57) ABSTRACT

Quantum sensors provide excellent performance combining high sensitivity with spatial resolution. Unfortunately, they can only detect signal fields at frequencies in a few accessible ranges, typically low frequencies up to the experimentally achievable control field amplitudes and a narrow window around their resonance frequencies. Fortunately, arbitrary-frequency signals can be detected by using the sensor qubit as a quantum frequency mixer, enabling a variety of sensing applications. The technique leverages nonlinear effects in periodically driven (Floquet) quantum systems to achieve quantum frequency mixing of the signal and an applied AC bias field. The frequency-mixed field can be detected using Rabi and CPMG sensing techniques with the bias field. Frequency mixing can distinguish vectorial components of an oscillating signal field, thus enabling arbitrary-frequency vector magnetometry. Using this protocol with nitrogen-vacancy centers in diamond to sense a 150 MHz signal field demonstrates the versatility of the quantum mixer sensing technique.

18 Claims, 8 Drawing Sheets

(56) References Cited

OTHER PUBLICATIONS

Anderson et al. "High-resolution antenna near-field imaging and sub-THz measurements with a small atomic vapor-cell sensing element." 2018 11th Global Symposium on Millimeter Waves (GSMM). IEEE, 2018, 3 pages.
Arnal et al. "Chaos-assisted tunneling resonances in a synthetic Floquet superlattice." Science Advances 6.38 (2020): eabc4886, 7 pages.
Balasubramanian, et al. "Nanoscale imaging magnetometry with diamond spins under ambient conditions." Nature 455.7213 (2008): 648-651.
Bardin et al. "Microwaves in quantum computing." IEEE journal of microwaves 1.1 (2021): 403-427, 25 pages.
Bar-Gill et al. "Suppression of spin-bath dynamics for improved coherence of multi-spin-qubit systems." Nature Communications 3.1 (2012): 858, 6 pages.
Barry et al. "Sensitivity optimization for NV-diamond magnetometry." Reviews of Modern Physics 92.1 (2020): 015004, 74 pages.
Boss et al. "Quantum sensing with arbitrary frequency resolution." Science 356.6340 (2017): 837-840.
Boyers et al. "Exploring 2D synthetic quantum Hall physics with a quasiperiodically driven qubit." Physical Review Letters 125.16 (2020): 160505, 6 pages.
Broadway et al. "Improved current density and magnetization reconstruction through vector magnetic field measurements." Physical Review Applied 14.2 (2020): 024076, 15 pages.
Bylander et al. "Noise spectroscopy through dynamical decoupling with a superconducting flux qubit." Nature Physics 7.7 (2011): 565-570, 6 pages.
Carr et al. "Effects of diffusion on free precession in nuclear magnetic resonance experiments." Physical Review 94.3 (1954): 630, 13 pages.
Casola et al. "Probing condensed matter physics with magnetometry based on nitrogen-vacancy centres in diamond." Nature Reviews Materials 3.1 (2018): 1-13.
Chen et al. "Calibration-free vector magnetometry using nitrogen-vacancy center in diamond integrated with optical vortex beam." Nano Letters 20.11 (2020): 8267-8272.
Clevenson et al. "Robust high-dynamic-range vector magnetometry with nitrogen-vacancy centers in diamond." Applied Physics Letters 112.25 (2018), 6 pages.
Doherty et al. "The nitrogen-vacancy colour centre in diamond." Physics Reports 528.1 (2013): 1-45, 45 pages.
Eckardt "Colloquium: Atomic quantum gases in periodically driven optical lattices." Reviews of Modern Physics 89.1 (2017): 011004, 30 pages.
Else et al. "Discrete time crystals." Annual Review of Condensed Matter Physics 11 (2020): 467-499, 35 pages.
Else et al. "Floquet time crystals." Physical Review Letters 117.9 (2016): 090402, 5 pages.
Ernst et al. "Decoupling and recoupling using continuous-wave irradiation in magic-angle-spinning solid-state NMR: A unified description using bimodal Floquet theory." The Journal of Chemical Physics 123.6 (2005), 10 pages.
Fancher, et al. "Rydberg atom electric field sensors for communications and sensing." IEEE Transactions on Quantum Engineering 2 (2021): 1-13.
Fisher et al. "Single photon frequency conversion for frequency multiplexed quantum networks in the telecom band." Physical Review Letters 127.2 (2021): 023602, 6 pages.
Gefen et al. "Overcoming resolution limits with quantum sensing." Nature Communications 10.1 (2019): 4992, 9 pages.
Genov et al. "Mixed dynamical decoupling." Quantum Science and Technology 4.3 (2019): 035010, 17 pages.
Geva et al. "On the relaxation of a two-level system driven by a strong electromagnetic field." The Journal of Chemical Physics 102.21 (1995): 8541-8561.
Gilmore et al. "Quantum-enhanced sensing of displacements and electric fields with two-dimensional trapped-ion crystals." Science 373.6555 (2021): 673-678, 7 pages.
Goldman et al. "Periodically driven quantum systems: effective Hamiltonians and engineered gauge fields." Physical Review X 4.3 (2014): 031027, 29 pages.
Gomez-Leon et al. "Designing adiabatic time evolution from high-frequency bichromatic sources." Physical Review Research 2.3 (2020): 033412, 9 pages.
Gottesman et al. "Longer-baseline telescopes using quantum repeaters." Physical Review Letters 109.7 (2012): 070503, 5 pages.
Grushin et al. "Floquet fractional Chern insulators." Physical Review Letters 112.15 (2014): 156801, 5 pages.
Guo et al. "Distributed quantum sensing in a continuous-variable entangled network." Nature Physics 16.3 (2020): 281-284.
Hirose et al. "Continuous dynamical decoupling magnetometry." Physical Review A 86.6 (2012): 062320, 5 pages.
Horsley et al. "Microwave device characterization using a widefield diamond microscope." Physical Review Applied 10.4 (2018): 044039, 10 pages.
Hunsperger et al. "Applications of Integrated Optics and Current Trends." Integrated Optics: Theory and Technology (1995): 311-333, 23 pages.
Jiang et al. "Floquet maser." Science Advances 7.8 (2021): eabe0719, 9 pages.
Jiang et al. "Floquet Spin Amplification." arXiv preprint arXiv:2112.06190 (2021), 20 pages.
Jiang et al. "Search for axion-like dark matter with spin-based amplifiers." Nature Physics 17.12 (2021): 1402-1407, 7 pages.
Joas et al. "Quantum sensing of weak radio-frequency signals by pulsed Mollow absorption spectroscopy." Nature Communications 8.1 (2017): 964, 6 pages.
Jomaa et al. "Near-field characterization for 13.56 MHz RFID antenna." 2017 International Symposium on Electromagnetic Compatibility—EMC Europe. IEEE, 2017, 4 pages.
Korber et al. "Interacting topological frequency converter." Physical Review Research 2.2 (2020): 022023, 6 pages.
Krantz et al. "A quantum engineer's guide to superconducting qubits." Applied Physics Reviews 6.2 (2019), 58 pages.
Kumar "Quantum frequency conversion." Optics Letters 15.24 (1990): 1476-1478.
Lang et al. "Dynamical-decoupling-based quantum sensing: Floquet spectroscopy." Physical Review X 5.4 (2015): 041016, 12 pages.
Langford et al. "Efficient quantum computing using coherent photon conversion." Nature 478.7369 (2011): 360-363.
Leskes et al. "Floquet theory in solid-state nuclear magnetic resonance." Progress in nuclear magnetic resonance spectroscopy 57.4 (2010): 345-380, 36 pages.
Li et al. "Cat codes with optimal decoherence suppression for a lossy bosonic channel." Physical Review Letters 119.3 (2017): 030502, 7 pages.
Lindner et al. "Floquet topological insulator in semiconductor quantum wells." Nature Physics 7.6 (2011): 490-495.
Linskens et al. "Two-photon Rabi oscillations." Physical Review A 54.6 (1996): 4854, 9 pages.
Long et al. "Many-Body Localization with Quasiperiodic Driving." arXiv preprint arXiv:2108.04834 (2021), 20 pages.
Long et al. "Nonadiabatic topological energy pumps with quasiperiodic driving." Physical Review Letters 126.10 (2021): 106805, 7 pages.
Loretz et al. "Radio-frequency magnetometry using a single electron spin." Physical Review Letters 110.1 (2013): 017602, 12 pages.
Maertz et al. "Vector magnetic field microscopy using nitrogen vacancy centers in diamond." Applied Physics Letters 96.9 (2010), 4 pages.
Malz et al. "Topological two-dimensional Floquet lattice on a single superconducting qubit." Physical Review Letters 126.16 (2021): 163602, 7 pages.
Martin et al. "Topological frequency conversion in strongly driven quantum systems." Physical Review X 7.4 (2017): 041008, 20 pages.
Maze et al. "Nanoscale magnetic sensing with an individual electronic spin in diamond." Nature 455.7213 (2008): 644-647.

(56) References Cited

OTHER PUBLICATIONS

Meiboom et al. "Modified spin-echo method for measuring nuclear relaxation times." Review of Scientific Instruments 29.8 (1958): 688-691.
Meyer et al. "Assessment of Rydberg atoms for wideband electric field sensing." Journal of Physics B: Atomic, Molecular and Optical Physics 53.3 (2020): 034001, 14 pages.
Oxborrow et al. "Room-temperature solid-state maser." Nature 488.7411 (2012): 353-356.
Primas "Generalized perturbation theory in operator form." Reviews of Modern Physics 35.3 (1963): 710, 3 pages.
Ramelow et al. "Polarization-entanglement-conserving frequency conversion of photons." Physical Review A 85.1 (2012): 013845, 5 pages.
Ramsey "A molecular beam resonance method with separated oscillating fields." Physical Review 78.6 (1950): 695, 5 pages.
Roelli et al. "Molecular platform for frequency upconversion at the single-photon level." Physical Review X 10.3 (2020): 031057, 14 pages.
Roses et al. "Simulating long-range hopping with periodically driven superconducting qubits." Physical Review Research 3.3 (2021): 033288, 8 pages.
Rudner et al. "Anomalous edge states and the bulk-edge correspondence for periodically driven two-dimensional systems." Physical Review X 3.3 (2013): 031005, 15 pages.
Ryan et al. "Robust decoupling techniques to extend quantum coherence in diamond." Physical Review Letters 105.20 (2010): 200402, 5 pages.
Schloss et al. "Simultaneous broadband vector magnetometry using solid-state spins." Physical Review Applied 10.3 (2018): 034044, 17 pages.
Scholz et al. "Operator-based Floquet theory in solid-state NMR." Solid State Nuclear Magnetic Resonance 37.3-4 (2010): 39-59, 21 pages.
Scholz et al. "Operator-based triple-mode Floquet theory in solid-state NMR." The Journal of Chemical Physics 127.20 (2007), 13 pages.
Shao et al. "Wide-Field Optical Microscopy of Microwave Fields Using Nitrogen-Vacancy Centers in Diamonds." Advanced Optical Materials 4.7 (2016): 1075-1080.
Shirley "Solution of the Schrödinger equation with a Hamiltonian periodic in time." Physical Review 138.4B (1965): B979, 9 pages.
Shu et al. "Observation of floquet Raman transition in a driven solid-state spin system." Physical Review Letters 121.21 (2018): 210501, 6 pages.
Sinatkas et al. "Electro-optic modulation in integrated photonics." Journal of Applied Physics 130.1 (2021), 36 pages.
Souza et al. "Robust dynamical decoupling." Philosophical Transactions of the Royal Society A: Mathematical, Physical and Engineering Sciences 370.1976 (2012): 4748-4769, 22 pages.
Staacke et al. "Method of full polarization control of microwave fields in a scalable transparent structure for spin manipulation." Journal of Applied Physics 128.19 (2020), 10 pages.
Su et al. "Search for exotic spin-dependent interactions with a spin-based amplifier." Science Advances 7.47 (2021): eabi9535, 9 pages.
Taylor et al. "High-sensitivity diamond magnetometer with nanoscale resolution." Nature Physics 4.10 (2008): 810-816, 8 pages.
Wade et al. "Real-time near-field terahertz imaging with atomic optical fluorescence." Nature Photonics 11.1 (2017): 40-43, 5 pages.
Wang et al. "Coherence protection and decay mechanism in qubit ensembles under concatenated continuous driving." New Journal of Physics 22.12 (2020): 123045, 16 pages.
Wang et al. "Efficient frequency conversion in a degenerate x (2) microresonator." Physical Review Letters 126.13 (2021): 133601, 7 pages.
Wang et al. "High-resolution vector microwave magnetometry based on solid-state spins in diamond." Nature Communications 6.1 (2015): 6631, 5 pages.
Wang et al. "Nanoscale vector AC magnetometry with a single nitrogen-vacancy center in diamond." Nano Letters 21.12 (2021): 5143-5150.
Wang et al. "Observation of symmetry-protected selection rules in periodically driven quantum systems." Physical Review Letters 127.14 (2021): 140604, 8 pages.
Wang et al. "Observation of the high-order Mollow triplet by quantum mode control with concatenated continuous driving." Physical Review A 103.2 (2021): 022415, 12 pages.
Wang et al., "Sensing of Arbitrary-Frequency Fields Using a Quantum Mixer," Phys. Rev. X 12, 021061, Jun. 17, 2022, 22 pages.
Weggler et al. "Determination of the three-dimensional magnetic field vector orientation with nitrogen vacany centers in diamond." Nano Letters 20.5 (2020): 2980-2985.
Wintersperger et al. "Realization of an anomalous Floquet topological system with ultracold atoms." Nature Physics 16.10 (2020): 1058-1063.
Wolf et al. "Subpicotesla diamond magnetometry." Physical Review X 5.4 (2015): 041001, 10 pages.
Yaghjian "An overview of near-field antenna measurements." IEEE Transactions on antennas and propagation 34.1 (1986): 30-45.
Yan et al. "Rotating-frame relaxation as a noise spectrum analyser of a superconducting qubit undergoing driven evolution." Nature Communications 4.1 (2013): 2337, 8 pages.
Zhang et al. "Quantum-assisted Distortion-free audio signal sensing." arXiv preprint arXiv:2111.04100 (2021), 31 pages.
Zhang et al. "Vector magnetometer based on synchronous manipulation of nitrogen-vacancy centers in all crystal directions." Journal of Physics D: Applied Physics 51.15 (2018): 155102, 13 pages.
Zheng et al. "Microwave-free vector magnetometry with nitrogen-vacancy centers along a single axis in diamond." Physical Review Applied 13.4 (2020): 044023, 9 pages.

* cited by examiner

Longitudinal signal
$\omega = \omega_0$
Stark shift neglected
Stark shift included
f (MHz)

Transverse signal
$\omega = \omega_0$
Stark shift neglected
Stark shift included $\omega = \omega_0 + \delta_Z$
Floquet prediction
f (MHz)
$\Omega_b/(2\pi)$ (MHz)

$\omega = \omega_0 + \delta_Z$
Floquet prediction
$\Omega_b/(2\pi)$ (MHz)

QUANTUM MIXER TO SENSE ARBITRARY-FREQUENCY FIELDS

CROSS-REFERENCE TO RELATED APPLICATION(S)

This application claims the priority benefit, under 35 U.S.C. 119(e), of U.S. Application No. 63/325,929, filed on Mar. 31, 2022, which is incorporated herein by reference in its entirety.

GOVERNMENT SUPPORT

This invention was made with government support under W911NF-20-F-0026 awarded by the Army Research Office. The government has certain rights in the invention.

BACKGROUND

From environmental noise in quantum bit (qubit) platforms, to magnetism in condensed matter physics and microwave antennas, magnetic fields of interest span zero (direct current, DC) to GHz frequencies. Quantum sensors such as neutral atoms, trapped ions and solid-state spin defect centers have made rapid progress in performance, yet have been limited to standard sensing protocols, including Rabi oscillation, pulsed dynamical decoupling, and mixed dynamical decoupling. These protocols severely limit the range of accessible frequencies to either a narrow window around a quantum sensor's resonance frequency or a low frequency range constrained by the control field amplitude. For example, the accessible frequency range for solid-state nitrogen-vacancy (NV) spins in diamond is currently limited to a near-resonant window around the 2.87 GHz zero-field splitting of the NV spins or below a few MHz. NV ensembles have not yet been able to sense intermediate frequencies (50 MHz to 2 GHz) or ultra-high frequencies (above a few GHz) due to the challenges of achieving large static fields and strong driving with the required homogeneity. Even for a single spin defect center, avoiding large static fields while achieving arbitrary frequency vector magnetometry is desirable.

SUMMARY

One way to address constraints on sensing intermediate and ultra-high frequencies with quantum sensors is to convert the desired signal to an accessible frequency range with a classical frequency mixer. Unfortunately, classical frequency mixers tend to be bulky and can limit the spatial resolution of a quantum sensor. Fortunately, integrating the frequency mixer with the sensor itself by exploiting virtual transitions between different Fourier manifolds in periodically driven quantum (Floquet) systems avoids this increase in bulk and reduction in spatial resolution. An integrated frequency mixer and quantum sensor that exploits these virtual transitions is the quantum analog of a frequency mixer and is called a quantum frequency mixer or quantum mixer.

Quantum frequency mixing can be used to measure an alternating current (AC) signal field oscillating at a signal frequency $\omega_s$ with a quantum system. This quantum system has a resonance that is associated with a transition between a first quantum state and a second quantum state and centered at a resonance frequency $\omega_0$. The quantum frequency mixing method includes initializing the quantum system to the first quantum state, then simultaneously applying the AC signal field and an AC bias field to the quantum system. The AC bias field oscillates at a bias frequency $\omega_b$ selected based on the signal frequency and the resonance frequency. ($|\omega_0-\omega_s|$ can be greater than a linewidth of the resonance.) The quantum system mixes the AC signal field with the AC bias field to produce a target field having a spectral component oscillating at the resonance frequency. This target field changing a population of the first quantum state, which is measured and used to determine an amplitude of the AC signal field.

The AC signal field can be longitudinally polarized and the AC bias field can be transversely polarized. Alternatively, the AC signal field can be transversely polarized and the AC bias field can be transversely or longitudinally polarized.

For instance, the quantum system may comprise a spin defect center, in which case initializing the spin defect center to the first quantum state comprises includes optically pumping the spin defect center and measuring the population of the first quantum state comprises detecting fluorescence emitted by the spin defect center. More specifically, the spin defect center can be a nitrogen vacancy center in diamond and the signal frequency can be between about 50 MHz and about 2 GHz.

Measuring the population of the first quantum state can include detecting a Rabi oscillation of the quantum system. The method may also include applying a control field oscillating at the resonance frequency to the quantum system while applying the AC signal and bias fields to the quantum system.

A system for measuring an AC signal field oscillating at a signal frequency $\omega_s$ may include a quantum system, bias field source, antenna, detector, and processor. The quantum system has a resonance associated with a transition of the quantum system between a first quantum state and a second quantum state and centered at a resonance frequency $\omega_0$. The bias field source can generate an AC bias field oscillating at a bias frequency $\omega_b$ selected based on the signal frequency and the resonance frequency. The antenna, which is in electromagnetic communication with the quantum system and operably coupled to the bias field source, applies the AC bias field to the quantum system while the quantum system is subject to the AC signal field such that the quantum system mixes the AC signal field with the AC bias field to produce a target field having a spectral component oscillating at the resonance frequency. The detector, which is in electromagnetic communication with the quantum system, senses a change in a population of the first quantum state caused by the target field. And the processor, which is operably coupled to the detector, determines an amplitude of the AC signal field based on the population of the first quantum state.

For instance, the quantum sensor can be a spin defect center, such as an NV center in diamond, in which case the detector can be a photodetector configured to detect fluorescence emitted by a spin defect center at an amplitude proportional to the population of the first quantum state. In this instance, the system may include an optical pump source, in optical communication with the spin defect center, to illuminate the spin defect center with an optical pulse selected to initialize the population of the first quantum state.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
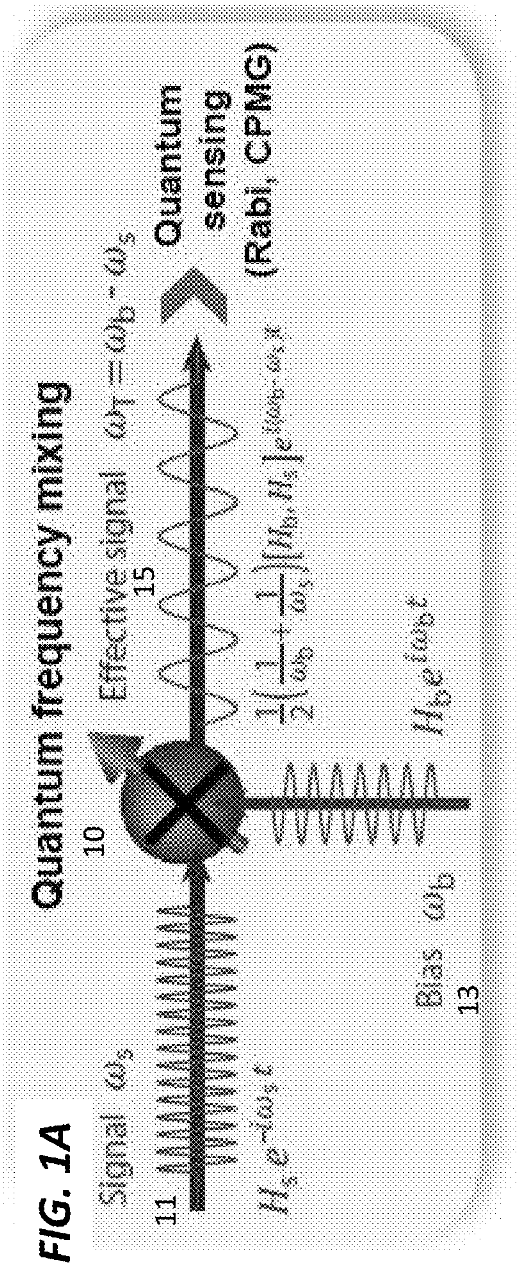
FIG. 1A illustrates an overview of quantum frequency mixing in a quantum system, illustrated here as a solid-state spin defect center (e.g., a nitrogen vacancy (NV) center in diamond).

Quantum frequency mixing enables well-known sensing protocols, such as continuous (Rabi) and pulsed dynamical decoupling protocols, to be extended to a broader range of frequencies, by converting signals at inaccessible frequencies to frequencies that well-known sensing protocols can tackle. In addition, quantum frequency mixing enables vector magnetometry at arbitrary frequencies by taking advantage of differences in the frequency conversions of transverse and longitudinal signal components. In addition to extending the frequency range of current quantum sensing capabilities, quantum frequency mixing also opens up more applications. In quantum control and quantum computation, for example, periodically driven systems (e.g., Floquet systems) provide platforms for studying geometric phases and designing non-Abelian holonomic gates for noise-resilient quantum computation. In quantum simulation, the synthetic dimension of multi-mode Floquet systems (quantum systems under multiple driving frequencies) can be used to engineer desired Hamiltonians for studying topological phases, such as topological frequency conversion and anomalous edge states. In classical and quantum communications, quantum frequency mixing provides a way to perform frequency modulation and frequency conversion along with other operations in the same system.

In classical electronics, a frequency mixer generates the sum and difference of the input frequencies. Frequency mixing is commonly used to convert signals to higher or lower frequency ranges, e.g., for more efficient amplification, transmission, detection, or noise rejection, especially for radio reception and high-frequency oscilloscopes. (Conversion to higher frequency is called up-conversion, and conversion to lower frequency is called down-conversion.) In quantum engineering, a classical frequency mixer up-converts the control fields to the resonance frequency of quantum devices to implement desired quantum gates. In addition, frequency conversion based on general nonlinear effects in different materials is also useful for optical engineering, quantum computation, quantum communication, and quantum sensing.

In quantum sensing, frequency mixing can be used to up- or down-convert a signal with a frequency component inaccessible with existing sensing protocols for a given quantum sensor. Unfortunately, classical frequency mixing is challenging in the context of quantum sensing, where the target signal might be localized at the nanoscale (and should be probed with a corresponding spatial resolution) or it is itself quantum in nature. In either scenario, mixing with a (bulky) classical frequency mixer might not be possible.

A generic embodiment of a quantum frequency mixer may include: (1) a quantum system with two (or more) levels acting as the quantum sensors (here, quantum sensors with two-level quantum systems are called qubit sensors); (2) initialization and readout capabilities for the quantum sensor; and (3) one or more sources to generate AC fields that can couple to the quantum system (such as electric or magnetic fields, optical e.m. fields, mechanical fields, etc.), including an AC bias field and other control fields used to manipulate the quantum system. The quantum frequency mixer is generally exposed to a target signal field, a physical quantity that couples to the quantum system being sensed (e.g., an electric field, magnetic field, or strain field). The description below is based on a specific system, with NV centers in diamond as the sensor and AC magnetic fields as bias and control fields. Quantum frequency mixers with other quantum systems, including neutral atoms, trapped ions, or superconducting qubits, are also possible.

Quantum Frequency Mixing

FIG. 1A illustrates a quantum frequency mixing scheme that provides the benefit(s) of classical frequency mixing without sacrificing the nanoscale spatial resolution or quantum nature of quantum sensing. In this scheme, an effective or target frequency Hamiltonian 15 emerges from the frequency mixing of a signal Hamiltonian 11 and an AC bias Hamiltonian 13 in a quantum system, shown in FIG. 1A as a spin defect center (e.g., a nitrogen vacancy (NV) center in diamond). The target Hamiltonian frequency, $\omega_T$, can be probed experimentally.

The quantum frequency mixing scheme shown in FIG. 1A is inspired by two-photon transitions mediated by an extra state coupled to two levels of the quantum system, exploiting a state in the virtual Floquet space as a third level that mediates such transitions. When mapping back these transitions to the Hilbert space, the joint effect of the AC bias and signal Fourier components $H_b e^{i\omega_b t}$ and $H_s e^{-\omega_s t}$, respectively, in the system Hamiltonian is equivalent to an effective Hamiltonian with a frequency $\omega_b - \omega_s$.

Quantum frequency mixing enables a protocol for quantum sensing over an arbitrary frequency range. Given a signal with frequency $\omega_s$, applying an AC bias field with frequency co b to the quantum sensor converts the signal to a target frequency $\omega_T = \omega_b - \omega_s$ which is in the accessible frequency range of the quantum sensor's sensing protocols, as shown in FIG. 1A. If the quantum sensor has a quantum system that is resonant at a resonance frequency $\omega_0$ with a full-width half-maximum (FWHM) resonance linewidth of $\Delta\omega$, quantum frequency mixing makes it possible to sense signals at frequencies that are more than one linewidth away from the resonance frequency, i.e., $\Delta\omega < |\omega_0 - \omega_s|$, by selecting the appropriate AC bias frequency $\omega_b$. In other words, quantum frequency mixing enables sensing of signals at frequencies greater than $\omega_0 + \Delta\omega$ and/or less than $\omega_0 - \Delta\omega$. (If the signal frequency falls within the resonance linewidth, then the quantum system can sense it directly.) The frequency-converted signal oscillates at a frequency $\omega_T$, which can be tuned by the AC bias field frequency to match the resonance frequency of the quantum system, and thus can be probed using an appropriate AC quantum sensing protocol, such as pulsed dynamical decoupling or continuous decoupling (by detecting Rabi oscillations of either a population or a spin-locked state).

Figure 1B:
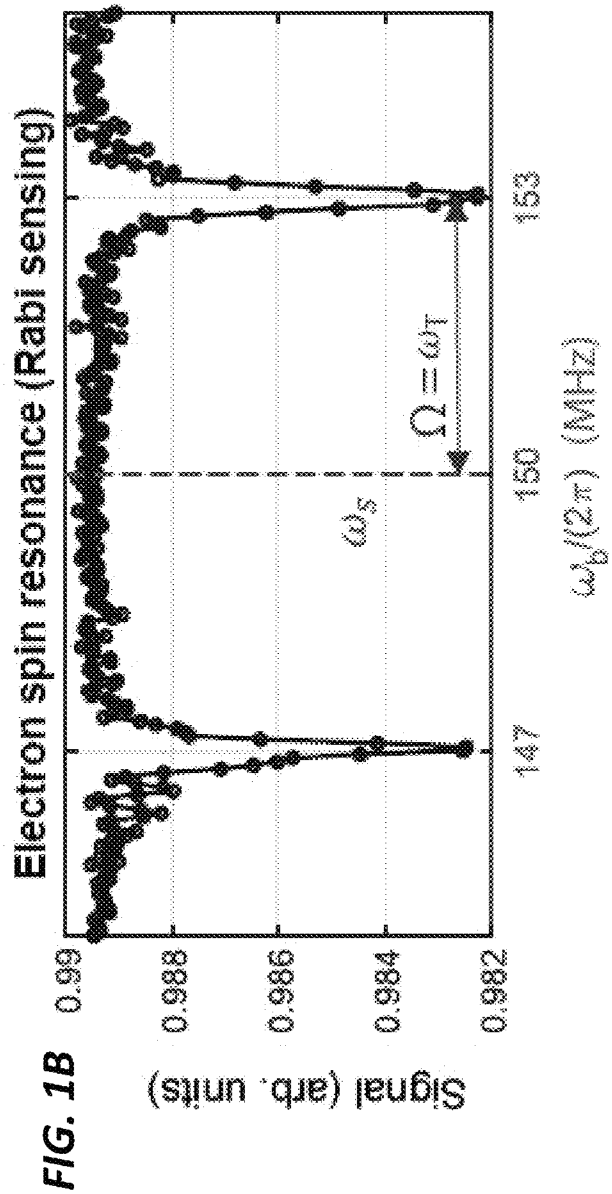
FIG. 1B is a plot of an electron spin resonance (ESR) measurement by a NV-based quantum frequency mixer of an alternating current (AC) signal field at 150 MHz, which is not accessible with conventional NV-based quantum sensors.

FIG. 1B shows results of an electron spin resonance (ESR) experiment to probe w T using an ensemble of NV centers, which is one exemplary implementation of a quantum frequency mixer. This ESR experiment involved quantum frequency mixing with the Rabi method using an ensemble of electronic spin quantum systems based on NV centers in diamond. The NV centers are aligned to a magnetic field of 239 Gauss such that they have a resonance frequency at $\omega_0 = (2\pi)2.2$ GHz. The spin is locked to a state $(|0\rangle + |1\rangle)/\sqrt{2}$ by a continuous transverse driving field with amplitude is $\Omega = (2\pi)3$ MHz in the rotating frame. The quantum system's resonance frequency in the rotating frame is 3 MHz, so conventional sensing methods cannot detect a 150 MHz transverse signal directly. By simultaneously applying am AC bias field and sweeping its frequency $\omega_b$, it is possible to observe an electron spin resonance when $\omega_b - \omega_s = \pm\Omega$, demonstrating that quantum sensor has simultaneously converted and detected the signal at the target frequency $\omega_T = \omega_b - \omega_s$. In other words, sweeping the bias field frequency $\omega_b$ makes it possible to detect a signal field at $\omega_s = (2\pi)150$ MHz: resonances appear when the down-converted frequency $\omega_T = \pm(\omega_s - \omega_b)$ matches the probing drive amplitude at $\Omega = (2\pi)3$ MHz.

Example Experimental Implementation of a Quantum Frequency Mixer

Figure 1C:
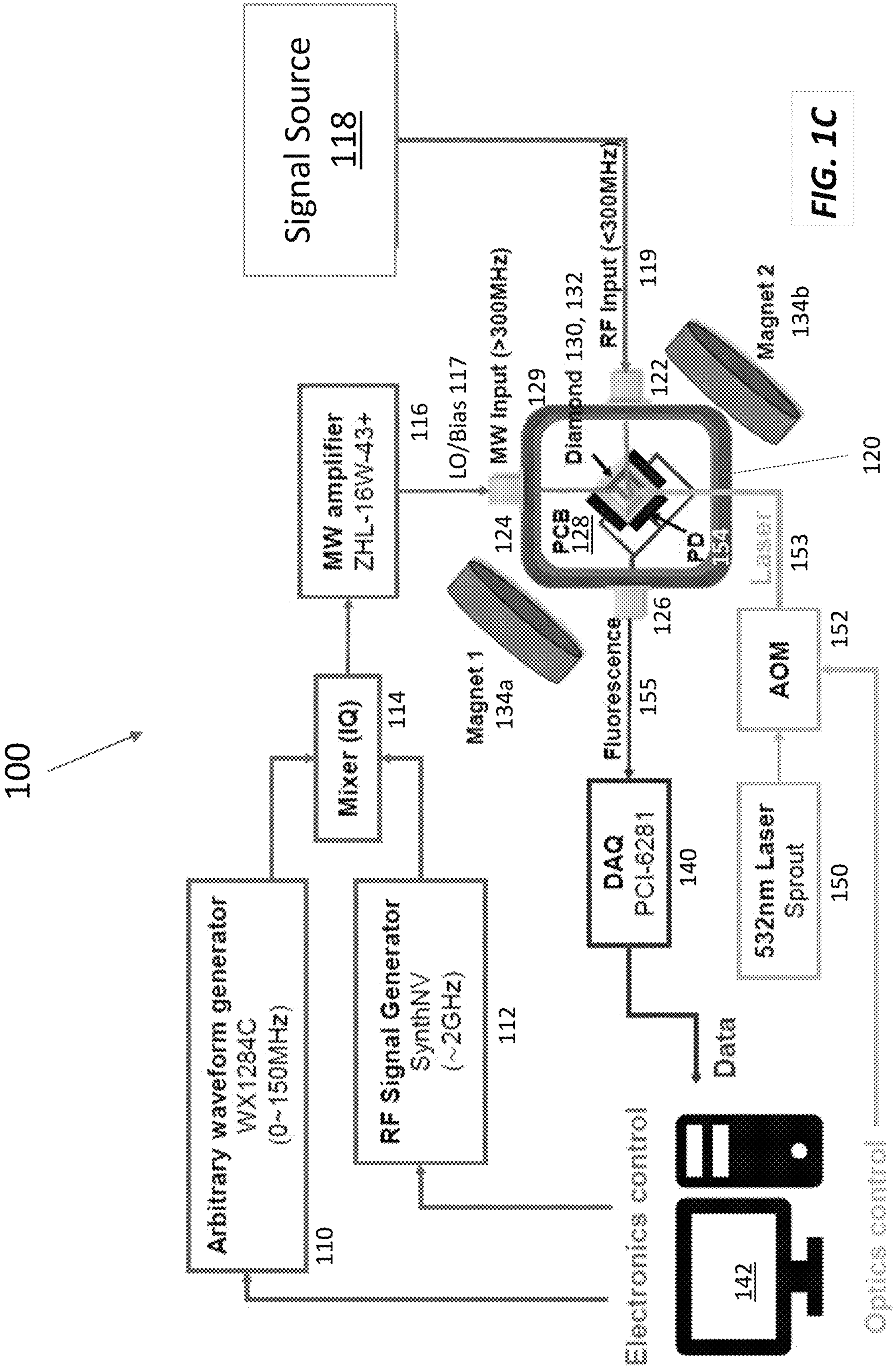
FIG. 1C illustrates a quantum frequency mixer configured to make AC vector magnetometry measurements at arbitrary frequencies, including frequencies from about 50 MHz to about 2 GHz.

FIG. 1C illustrates the exemplary quantum frequency mixer 100 used to make the ESR measurements shown in FIG. 1B. This quantum frequency mixer 100 includes a diamond host 130 that is mounted on a printed circuit board (PCB) 128 and contains qubits in the form of an ensemble of NV centers 132. These NV centers 132 have electron spin resonances at around 2.2 GHz; quantum sensors with other resonance frequencies are also possible. It also includes a multi-channel arbitrary waveform generator (AWG) 110, radio-frequency (RF) signal generator 112, classical frequency mixer 114, and microwave amplifier 116, which are used to generate a bias or local oscillator (LO) signal 117. Two channels of the AWG 110 emit in-phase (I) and quadrature (Q) components of a pulsed, sweeping or chirping low-frequency signal under the control of a computer 142 or another controller. The classical frequency mixer 114 mixes these IQ components with a continuous-wave, fixed-frequency signal at about 2 GHz from the RF signal generator 112. The microwave amplifier 116 amplifies the classical mixer's output to produce the bias 117.

A signal source 118 emits the AC signal 119 being measured. This AC signal 119 is outside the resonance band of the NV centers 132 and is up- or down-converted using quantum mixing with the AC bias 117 by the NV centers 132 themselves. (For the ESR measurement shown in FIG. 1B, the signal source 118 was another channel of the AWG 110, and the AC signal 119 was a tone at a frequency of 150 MHz, which is well below the 2.2 GHz electron spin resonance frequency of the NV centers 132.) The AC signal 119 and AC bias 117 are coupled to the NV centers 132 via respective inputs 122 and 124 on the PCB 128. The inputs 122 and 124 are coupled to and drive a conductive loop structure 129 on the PCB 128 that surrounds the NV centers 132 and diamond 130 and applies the AC bias field 117 and AC signal 119 to the NV centers 132. (In other quantum mixers, a conductive loop structure 129 or other antenna may apply the AC bias field 117 to the quantum system while the quantum system (here, the NV centers 132) is subject to an ambient AC signal or the AC signal can be applied directly to the quantum system via a direct attachment, e.g., for measuring temperature, pressure, or strain, or another antenna.)

While the NV centers 132 are subject to and mix the AC bias 117 and AC signal 119, they perform an optically detected magnetic resonance (ODMR) or ESR measurement of the resulting intermediate or target frequency signal. As understood by those of ordinary skill in the art, in an ODMR measurement in an NV center, the electron spin state of the NV center is optically pumped for spin initialization and readout while Zeeman splitting caused by a DC bias magnetic field lifts the degeneracy of the NV center's $m_s = \pm 1$ states. In the quantum frequency mixer 100 in FIG. 1C, opposing magnets 134_a_ and 134_b_ apply the DC bias magnetic field to the NV centers 132 while the NV centers 132 are optically pumped with a gated or modulated optical signal 153. This modulated optical signal 153 is generated by a 532 nm laser 150 and modulated with an acousto-optic modulator (AOM) 152 controlled by the computer 142.

Photodetectors 154 in optical communication with the NV centers 132 detect the fluorescence emitted by the NV centers 132 as part of the ODMR measurement and transduces the fluorescence into an analog electrical signal 155. An analog-to-digital converter (ADC) 140 converts this analog signal 155 into a digital signal that can be processed with the computer 142 to yield information about the signal 119.

Multi-Mode Floquet Theory

The synthetic ladder energy structure of Floquet systems yields rich dynamics and broad applications. In quantum simulation, Floquet systems have become versatile platforms for creating and characterizing exotic states of matter such as time crystals, topological phases, and quantum chaos, and Floquet states have been exploited to characterize dynamical symmetries, observe stimulated Raman transitions, and simulate long-range hopping. In quantum metrology, Floquet spectroscopy has been developed to sense AC magnetic field signals and analyze spin systems. For example, Floquet systems can be used to amplify weak signals by engineering spin-based masers, with applications in the dark matter searches. When driving with incompatible frequencies, the Floquet ladder structure extends into higher dimensions, leading to even more intriguing applications such as topological frequency conversion. Under multiple driving frequencies, the dynamics of the quantum systems can be solved by multi-mode Floquet theory. However, most multi-mode Floquet methods address only zero-frequency (on-resonance) terms, which give rise to static effective Hamiltonians.

The performance of quantum sensing via quantum frequency mixing can be evaluated using a modified multi-mode Floquet theory. This modified multi-mode Floquet theory can also be used to design effective sensing protocols, including a protocol for arbitrary-frequency vector magnetometry. This framework uses an effective frequency-mixed time-dependent Hamiltonian to identify the frequency modes that dominate the dynamics, and thus to create protocols for frequency-mixer-based quantum sensing. The precision of the analytical approximation is evaluated below by numerically characterizing the evolution of a qubit under two driving frequencies.

The dynamics of time-periodic Hamiltonians can be solved by Floquet theory, where a time-dependent Schrödinger equation $i(\partial/\partial t)\Psi(t)=H(t)\Psi(t)$ is simplified to a time-independent infinite-dimensional Floquet matrix problem $H_F\Phi=\lambda\Phi$. Here $\lambda$ is the eigenvalue of the Floquet matrix representing the eigenenergy and $\Phi$ is the eigenvector comprised of Fourier components of eigenstates $\Phi(t)$ satisfying $\Psi(t)=e^{-i\lambda t}\Phi(t)$. In addition to fully diagonalizing the Floquet matrix (with proper matrix truncation) to numerically obtain the dynamics, the Floquet-space evolution can be analyzed via time-independent perturbation theory to highlight the contributions of frequencies of interest. However, these analytical methods are typically constrained to zero-frequency (on-resonance) terms. Alternate approaches to obtain time-dependent effective Hamiltonians such as the Jacobi-Anger expansion involve complicated analysis, limiting their application in quantum sensing.

The perturbation theory approach can be extended to analyze the non-static effective Hamiltonian due to the mixing of different frequency modes. In comparison to typical perturbation theory methods where higher-order Hamiltonian corrections arise from virtual transitions through intermediate energy levels, here the higher-order terms correspond to virtual transitions between different Fourier manifolds in the multi-mode Floquet space, which then give rise to frequency mixing between different modes.

Figure 2A:
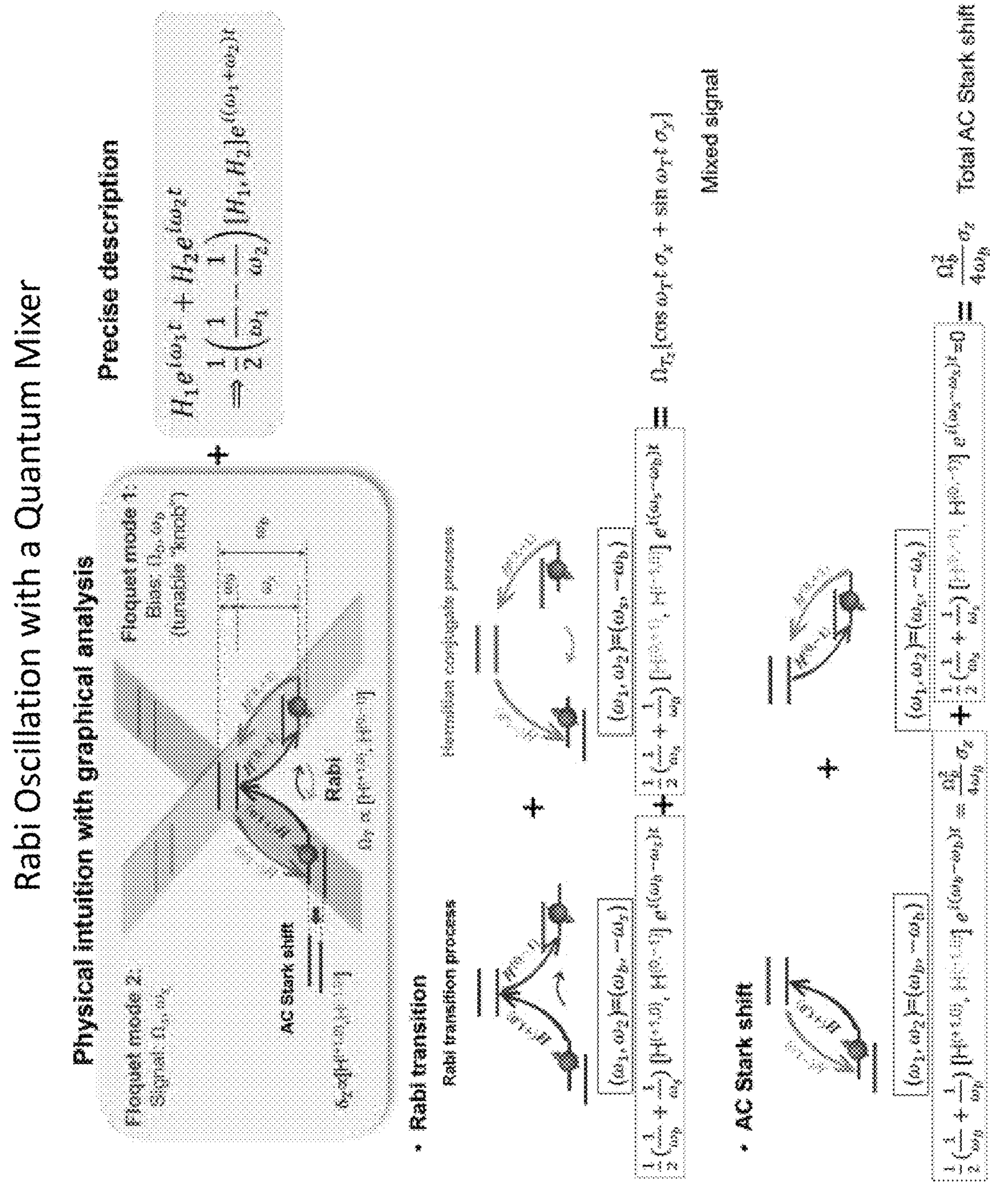
FIG. 2A illustrates the Rabi transition and the AC Stark shift mediated by the virtual Floquet states in a quantum frequency mixer.

Consider a bimodal Floquet problem. For a periodically driven quantum system with two frequency modes $(\omega_q, \omega_r)$, the Fourier expansion of the Hamiltonian in Hilbert space is $$H(t) = \sum_{n=-\infty}^{\infty} \sum_{k=-\infty}^{\infty} H^{(n,k)} e^{in\omega_q t} e^{ik\omega_r t},$$

where $H^{(n,k)}=(H^{(-n,-k)})^\dagger$ because the Hamiltonian H(t) is Hermitian and (n,k) denotes the frequency order. When expressed in the bimodal Floquet space, the Hamiltonian becomes a time-independent Floquet Hamiltonian, $$H_F = \sum_{n=-\infty}^{\infty} \sum_{k=-\infty}^{\infty} H^{(n,k)} \otimes F_n^q \otimes F_k^r \otimes \omega_q F_z^q + \omega_r F_z^r,$$

by introducing the ladder operator $F_n=\Sigma_m|m+n\rangle\langle m|$, representing a hopping process from $|m\rangle$ to $|m+n\rangle$ in the corresponding dimension in Floquet space, and the number operator $F_z=\Sigma_m m|m\rangle\langle m|$, representing the ladder energy. In other words, the Fourier components give rise to equidistant energy levels (with energy differences $w_{q,r}$) in the Floquet space as shown in FIG. 2A (described below). Applying a unitary transformation $U=e^S$ with S antihermitian to block-diagonalize the Floquet matrix $H_F$ given above and then transforming back to the Hilbert space yields an effective Hamiltonian $\overline{H}(t)$ describing the frequency-mixed dynamics of the system such that $$\overline{H}(t) = \sum_{m,h} \left[H^{(m,h)} + H_{(2)}^{(m,h)} + \ldots\right] e^{i(m\omega_q + h\omega_r)t}$$

where the second-order term is $$H_{(2)}^{(m,h)} = -\frac{1}{2} \sum_{n,k} \frac{\left[H^{(m-n,h-k)}, H^{(n,k)}\right]}{n\omega_q + k\omega_r}$$

with $n\omega_q+k\omega_r\neq 0$. For a general multi-mode Floquet problem, the results are valid by simply replacing the frequency modes (q, r) with (q, r, s, . . . ).

Typically, the expansion above for $\overline{H}(t)$ is truncated to the lowest non-zero contribution and also to retain only the cross-resonance $m\omega_q+h\omega_r=0$ terms, leading to a time-independent effective Hamiltonian when transforming back to Hilbert space. The expansion here includes all the modes (m, h) that dominate the system dynamics, neglecting only fast oscillation (in the spirit of the rotating wave approximation (RWA)):

$$m\omega_q + h\omega_r \ll \omega_l,$$

where $\omega_l \in \{n\omega_q+k\omega_r|n\omega_q+k\omega_r\neq 0, H^{(n,k)}\neq 0\}$ are all non-vanishing, high-frequency Fourier components of the Hamiltonian. This keeps a broader set of distinct, mixed-up driving frequencies that determine the system dynamics.

FIG. 2A illustrates these theoretical results up to second-order expansion. The "mixer"-like schematic as shown in FIG. 2A provides an intuitive picture for predicting and designing desired dynamics. The evolution of a quantum system under two unmixed Hamiltonian Fourier components $H_1e^{i\omega_1 t}$ and $H_2e^{i\omega_2 t}$ is equivalent—up to the second-order expansion—to the dynamics given by a mixed interaction with frequency $\omega_1+\omega_2$, given by $$H_1e^{i\omega_1 t}+H_2e^{i\omega_2 t}\Rightarrow\frac{1}{2}\left(\frac{1}{\omega_1}-\frac{1}{\omega_2}\right)[H_1,H_2]e^{i(\omega_1+\omega_2)t}.$$

For a general multi-mode problem, the effective Hamiltonian up to second order can be calculated by summing over mixed terms due to all frequency pairs, where each pair generates an effective mixed Hamiltonian according to the equation immediately above.

Consider using a qubit sensor (a quantum sensor with a two-level quantum system) with energy $\omega_0$ to detect a longitudinal signal field with Hamiltonian $H_{sz}=\Omega_{sz}\cos(\omega_s t)\sigma_z$ and a frequency $\omega_s$ that is outside the range accessible by the qubit sensor. The signal frequency can be mixed or converted to the qubit sensor's sensing band by applying a circularly polarized transverse bias field with the Hamiltonian $$H_b=\frac{\Omega_b}{2}[\cos(\omega_b t)\sigma_x+\sin(\omega_b t)\sigma_y].$$

In the absence of the signal field ($\Omega_{sz}=0$), the problem can be solved exactly in a rotating frame defined by $U=e^{-i(\omega_b t/2)\sigma_z}$, yielding a time-independent Hamiltonian $(\omega_0-\omega_b)\sigma_z/2+\Omega_b\sigma_x/2$. Note that for $\Omega_b\ll(\omega_0-\omega_b)$, to first order perturbation theory, this reduces to evolving under an energy shift $$\Omega_b^2/[4(\omega_0-\omega_b)]\sigma_z$$

(the AC Stark shift) in the rotating frame. This approach cannot be used to analyze the effect of the signal field, which is still time-dependent in the rotating frame, hence the use of Floquet theory to address the problem. The bimodal Floquet Hamiltonian—for modes ($\omega_b$, $\omega_s$)—is defined by the Fourier components in the lab frame $$H^{(0,0)}=\frac{\omega_0}{2}\sigma_z,\ H^{(\pm1,0)}=\frac{\Omega_b}{2}\sigma_\mp,\ H^{(0,\pm1)}=\frac{\Omega_{sz}}{2}\sigma_z$$

with the operators $\sigma_\pm=(\sigma_x\pm i\sigma_y)/2$. Each of these components gives rise to transitions in the 2D energy level ladder of Floquet space shown in FIG. 2A. $H^{(\pm1,0)}$ is associated with the hopping $$F^b_{\pm1}$$

in the first dimension, indicated by the diagonal sloping from lower left to upper right in FIG. 2A, while $H^{(0,\pm1)}$ is associated with hoppings in the second dimension, indicated by the diagonal sloping from upper left to lower right in FIG. 2A.

Focusing on quasi-energy conserving second-order transitions, two effects emerge: the AC Stark shift and the Rabi driving. The AC Stark shift is due to transitions in the bias field space alone ($H^{(\pm1,0)}$). Each transition changes the spin state (they do not commute) but the whole process conserves energy ($\omega_1=-\omega_2=\omega_b$), giving rise to a simple energy shift. This yields $$\overline{H}_{\delta_z}=\frac{1}{\omega_b}\left[H^{(1,0)},H^{(-1,0)}\right]=-\frac{\Omega_b^2}{4\omega_b}\sigma_z=\frac{\delta_z}{2}\sigma_z,$$

where $\delta_z$ is the AC Stark shift due to the bias field. The two hoppings $H^{(0,\pm1)}$ do not introduce such a shift since they leave the spin state unchanged (that is, they commute). Exploiting transitions involving both Floquet dimensions (the bias and signal field) induces a flip in the quantum state when $\omega_b-\omega_s\approx\omega_0$. These transitions, due to the two hoppings $H^{(1,0)}$, $H^{(0,-1)}$ and the Hermitian conjugate process, yield a Rabi driving given by $$\begin{aligned}\overline{H}_\Omega&=\left\{\frac{1}{2}\left(\frac{1}{\omega_b}+\frac{1}{\omega_s}\right)\left[H^{(1,0)},H^{(-1,0)}\right]e^{-i(\omega_b-\omega_s)t}+h.c.\right\}\\&=\Omega_{Tz}[\cos(\omega_T t)\sigma_x+\sin(\omega_T t)\sigma_y]\end{aligned}$$

where the mixed signal frequency is $\omega_T=\omega_b-\omega_s$ with an amplitude $\Omega_{Tz}=(\Omega_b\Omega_{sz}/4)(\omega_b^{-1}+\omega_s^{-1})$. When neglecting fast oscillation terms in comparison to the energy gap $\omega_0$, the effective Hamiltonian is given by $$\overline{H}=\frac{\omega_0}{2}\sigma_z+\overline{H}_{\delta_z}+\overline{H}_\Omega$$

The expression above for a mixed interaction applies to all frequency pairs, irrespective of their signs. This suggests considering terms $\propto[H^{(1,0)},H^{(0,1)}]$ that give rise to oscillations at $\omega_s+\omega_b$. However, these terms correspond to fast oscillations, i.e., $\omega_s+\omega_b\gg|\omega_T|$, $\omega_0$, and can be neglected, leaving only the term oscillating at the target sensing frequency. If the amplitudes $\Omega_b$, $\Omega_{sz}$ are much smaller than the mode frequencies $\omega_b$, $\omega_s$, then the perturbation expansion can be truncated to second order.

Figure 2B:
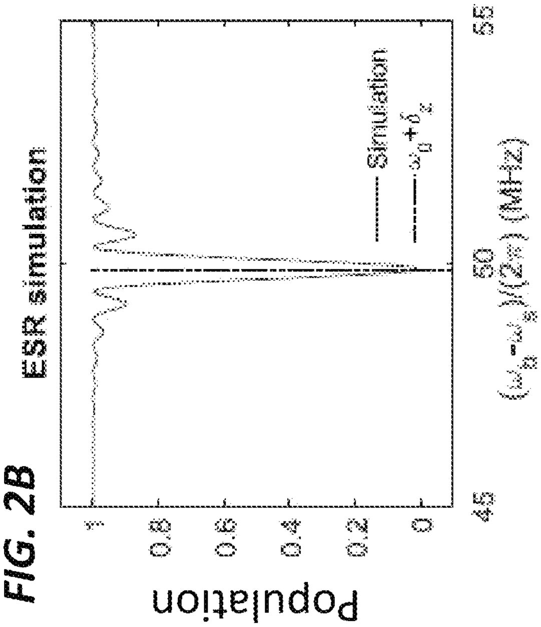
FIG. 2B is a plot of the simulated ground-state population as a function of the mixed frequency $\omega_b-\omega_s$ in an ESR measurement with a quantum frequency mixer with a resonance frequency at 50 MHz.
Figure 2C:
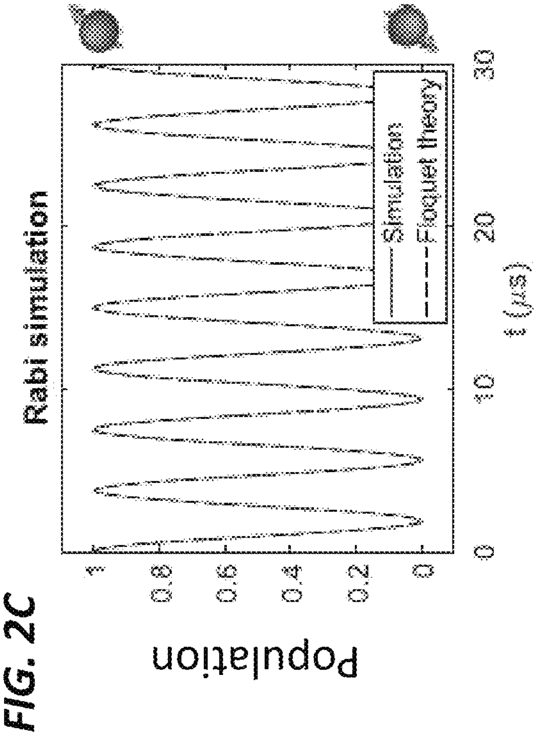
FIG. 2C is a plot of the simulated (solid trace) and theoretical (dashed trace) ground-state population as a function of time, at the resonance condition characterized in FIG. 2B, in a Rabi experiment with a quantum frequency mixer.

FIGS. 2A-2C illustrate the effective Hamiltonian predicted by multi-mode Floquet theory for a qubit of energy $\omega_0=(2\pi)50$ MHz and a signal field with frequency $\omega_s=(2\pi)375$ MHz and amplitude $\Omega_{sz}=(2\pi)10$ MHz. Quantum frequency-mixing is achieved by applying a bias field with $\Omega_b=\Omega_{sz}$.

FIG. 2A shows the Rabi transition and the AC Stark shift mediated by the virtual Floquet states. Transitions in Floquet spaces give rise to the effective Hamiltonian terms given above. In particular, FIG. 2A shows that both the effective frequency-mixed terms and the AC Stark shift terms can be obtained by analyzing the second-order transitions. Such an example illustrates how the Floquet analysis provides a clear physical picture of the frequency mixing as well as a precise mathematical formalism to calculate the effective Hamiltonian.

FIGS. 2B and 2C show results of numerical simulated system dynamics described by the modified multi-mode Floquet theory presented here. FIG. 2B is a plot of the qubit population in the $|0\rangle$ state at a fixed time t=1.875 μs as a function of the bias field frequency. Similar to an electron spin resonance (ESR) experiment, there is a resonance at $\omega_b-\omega_s=\omega_0+\delta_z$ (marked by a dashed line). The AC Stark shift here is obtained with a more precise analysis in the rotating frame such that $$\delta_z/2=\Omega_b^2/4(\omega_0-\omega_b).$$

expressed in the rotating frame defined by $\exp[-i(\omega t/2)\sigma_z]$ except for the signal and bias Hamiltonians, which are in the lab frame. The Bloch-Siegert shift $\Omega^2/(8\omega)$ and possible frequency mixing due to the spin-locking driving field in the Rabi measurement are neglected. In the notation of the polarizations of the signal, AC bias, and target (mixed) signals, $\sigma_\pm$ denotes a circularly polarized field with the form $\Omega[\cos(\omega t)\sigma_x\pm\sin(\omega t)\sigma_y]$, and $\sigma_{z,x}$ denote linearly polarized longitudinal and transverse fields with the form $\Omega\cos(\omega t)\sigma_{z,x}$. The drive polarization can be engineered by specific choices of the drive delivery hardware. All frequency mixing terms potentially of use for quantum sensing are listed for completeness. Terms that do not satisfy the near-resonance condition in Eq. (5) can be neglected in practical calculations.

TABLE 1

| Quantum Sensing Protocols based on Quantum Mixing | | | | | |
|---|---|---|---|---|---|
| | Protocol 1 | Protocol 2 | Protocol 3 | Protocol 4 | Protocol 5 |
| Signal Pol. $(\omega_s, \Omega_s)$ | $\sigma_z$ | $\sigma_z$ | $\sigma_x$ | $\sigma_x$ | $\sigma_x$ |
| Bias Pol. $(\omega_b, \Omega_b)$ | $\sigma_x$ | $\sigma_+$ | $\sigma_x$ | $\sigma_+$ | $\sigma_z$ |
| Target Pol. $(\omega_T, \Omega_T)$ | $\sigma_+$ or $\sigma_-$ | $\sigma_+$ | $-\sigma_z$ | $-\sigma_z$ | $\sigma_+$ or $\sigma_-$ |
| $\omega_T$ | $\omega_b-\omega\pm\omega_s$<br>$\omega_b+\omega\pm\omega_s$ | $\omega_b-\omega\pm\omega_s$ | $\omega_b-\omega_s$ | $\omega_b-\omega_s$ | $\omega_s-\omega\pm\omega_b$<br>$\omega_s+\omega\pm\omega_b$ |
| $\delta_z/2$ | $-\frac{\Omega_b^2\omega}{2(\omega_b^2-\omega^2)}$ | $-\frac{\Omega_b^2}{4(\omega_b-\omega)}$ | $-\frac{\Omega_b^2\omega}{2(\omega_b^2-\omega^2)}$<br>$-\frac{\Omega_{sx}^2\omega}{2(\omega_x^2-\omega^2)}$ | $-\frac{\Omega_b^2}{4(\omega_b-\omega)}$<br>$-\frac{\Omega_{sx}^2\omega}{2(\omega_x^2-\omega^2)}$ | $-\frac{\Omega_{sx}^2\omega}{2(\omega_b^2-\omega^2)}$ |
| $\Omega_T$ | $\frac{\Omega_{sz}}{4}\left(\frac{\Omega_b}{\omega_b-\omega}\mp\frac{\Omega_b}{\omega_s}\right)-$<br>$\frac{\Omega_{sz}}{4}\left(\frac{\Omega_b}{\omega_b+\omega}\mp\frac{\Omega_b}{\omega_s}\right)$ | $\frac{\Omega_{sz}}{4}\left(\frac{\Omega_b}{\omega_b-\omega}\mp\frac{\Omega_b}{\omega_s}\right)$ | $\frac{\Omega_{sx}}{2}\left(\frac{\Omega_b\omega}{\omega_b^2-\omega^2}+\frac{\Omega_b\omega}{\omega_s^2-\omega^2}\right)$ | $\frac{\Omega_{sx}}{4}\left(\frac{\Omega_b}{\omega_b-\omega}+\frac{\Omega_b}{\omega_s-\omega}\right)$ | $\frac{\Omega_{sx}}{4}\left(\frac{\Omega_b}{\omega_s-\omega}\mp\frac{\Omega_b}{\omega_b}\right)-$<br>$\frac{\Omega_{sx}}{4}\left(\frac{\Omega_b}{\omega_s+\omega}\mp\frac{\Omega_b}{\omega_b}\right)$ |
| $\epsilon=\Omega_T/\Omega_s$ | $\Omega_b/(2\omega_s)$ | $\Omega_b/(2\omega_s)$ | $\Omega_b/\omega(\omega_s\ll\omega)$,<br>$\Omega_b\omega/\omega_s^2(\omega_s\gg\omega)$ | $\Omega_b/(2\omega)(\omega_s\ll\omega)$,<br>$\Omega_b/(2\omega_s)(\omega_s\gg\omega)$ | $\Omega_b/(2\omega_b)$ |

FIG. 2C is a plot of the population in the $|0\rangle$ state as a function of time, at the resonance condition. Similar to a Rabi experiment, the population oscillates at a rate set by $\Omega_{Tz}$.

The simulated results of the system dynamics shown in FIGS. 2B and 2C validate the theoretical results above. In these simulations, the bias frequency was swept to determine $\omega_T$ and the time was swept to determine $\Omega_{Tz}$. As expected, the spin evolves on-resonance when $\omega_T=\omega_b-\omega_s=\omega_0+\delta_z$, with a rate set by the effective Rabi amplitude $\Omega_{Tz}$, as shown in FIGS. 2B and 2C. The numerical simulations in the plots compare well to the behavior predicted by the Hamiltonian $\overline{H}$ (dashed line in FIG. 2C).

Quantum Sensing by Quantum Frequency Mixing

The modified multi-frequency Floquet theory derived above can be used to devise various quantum sensing protocols and analyze their performance. TABLE 1 (below) gives an overview of quantum sensing protocols based on quantum frequency mixing. The parameters in TABLE 1 are The protocols in TABLE 1 can be subdivided in two classes of scenarios as follows: (1) longitudinal (commuting with the qubit sensor internal Hamiltonian) or transverse signal field; and (2) longitudinal or transverse bias field with linear or circular polarization. For each feasible combination of these scenarios, continuous (Rabi) or pulsed (Carr-Purcell-Meiboom-Gill (CPMG)) sensing protocols can be used to sense the effective signal at $\omega_T$.

Example 1: Sensing Longitudinal Signals by Rabi Oscillations

Considering using a quantum sensor to detect a longitudinal signal with frequency $\omega_s$ and determine the longitudinal signal's amplitude $\Omega_{sz}$. The quantum sensor has an (internal) energy $H_0=\omega_0\sigma_z/2$ and is subject to a circularly polarized bias $H_b$. The analysis can be carried out in the rotating frame set by $H_0$, where the Hamiltonian $H=H_{sz}+\widetilde{H_b}$. In this rotating frame, the modified bias term is $$\tilde{H}_b = \frac{\Omega_b}{2}[\cos(\tilde{\omega}_b t)\sigma_x + \sin(\tilde{\omega}_b t)\sigma_y],$$

where $\tilde{\omega}_b=\omega_b-\omega_0$ is the shifted bias frequency in the rotating frame. Assuming that $\tilde{\omega}_b-\omega_s$, $\Omega_{b,s}\ll\tilde{\omega}_b$, $\omega_s$ yields an effective Hamiltonian $\overline{H}_I$ with a target signal frequency $\omega_T=\omega_b-\omega_0-\omega_s$ and amplitude $$\Omega_{Tz} = \frac{\Omega_b\Omega_{sz}}{4}\left(\frac{1}{\omega_b-\omega_0}+\frac{1}{\omega_s}\right).$$

As simulated in FIGS. 2B and 2C, the effective target signal field can be used to drive the qubit evolution (Rabi oscillation) by setting $$\omega_T = \delta_z = -\Omega_b^2/(2\tilde{\omega}_b)$$

and thus estimate $\Omega_{sz}$.

Since the typical Rabi oscillation of the population state $|0\rangle$ is often limited by a short coherence time, a more robust sensing protocol is achieved by adding an additional driving field at frequency $\omega=\omega_0(+\delta_z)$ with amplitude $\Omega$ to perform Rabi sensing in the rotating frame, where the Rabi oscillation of an initial spin-locked state, $|+\rangle=(|0\rangle+|1\rangle)/\sqrt{2}$, is used to extract the target signal. Then, the target frequency $\omega_T$ can be simply set equal to $\Omega$ and the component of the effective target signal field orthogonal to the spin-locking x direction will drive Rabi oscillations. More precisely, the system initial state is set to $|+\rangle$. Then a spin-locking microwave drive is switched on. The drive, $(\Omega/2)[\cos(\omega t)\sigma_x+\sin(\omega t)\sigma_y]$, is on resonance with the static qubit sensor energy $\omega=\omega_0$. Simultaneously, the target signal and bias fields are applied. The effective Hamiltonian in the rotating frame becomes $$\overline{H}_I = \frac{\Omega}{2}\sigma_x + \Omega_{Tz}\sin[(\tilde{\omega}_b-\omega_s)t]\sigma_y,$$

where $\Omega_{Tz}$, $\delta_z\ll\Omega$, such that both the AC Stark shift and the effective target signal term along x are negligible. When the target signal frequency is on resonance with the static energy in the rotating frame $|\omega_b-\omega_0-\omega_s|=\Omega$, a Rabi oscillation is induced, which can be measured by monitoring the population of the initial state $|+\rangle$, yielding an oscillation signal S(t):

$$S(t) = P_{|+\rangle}(t) = \frac{1}{2}[1+\cos(\Omega_{Tz}t)].$$

The field amplitude $\Omega_{sz}$ can then be extracted from the signal oscillation frequency $\Omega_{Tz}$.

The effective target signal in the rotating frame is the same even in cases where the bias field and spin-locking drive are both linearly polarized, at the cost of additional AC Stark shifts and a Bloch-Siegert shift induced by the counter-rotating terms of the bias and the spin-locking fields, respectively. These static shifts have small amplitudes in comparison to $\Omega$ and can be neglected.

Example 2: Sensing Transverse Signals by Pulsed Dynamical Decoupling

When the signal field is transverse, adding either a longitudinal or a transverse bias field achieves quantum frequency mixing. For a longitudinal bias field, the analysis is similar to that described above by switching the bias and signal fields, with results in Protocol 5 in TABLE 1. Alternatively, a transverse signal field can be mixed with the same circularly polarized transverse bias field $H_b$ given above for detecting a longitudinal signal field.

Assume a transverse AC signal field couples to the quantum sensor with the Hamiltonian $$H_{sx} = \Omega_{sx}\cos(\omega_s t)\sigma_x.$$

Then the Hamiltonian in the rotating frame with the bias field is $H_I=\tilde{H}_b+\tilde{H}_{sx}$, where $\tilde{H}_b$ is given above and $\tilde{H}_{sx}$ is $$\tilde{H}_{sx} = \frac{\Omega_{sx}}{2}[\cos(\tilde{\omega}_s t)\sigma_x + \sin(\tilde{\omega}_s t)\sigma_x] + \frac{\Omega_{sx}}{2}[\cos(\tilde{\omega}_{ss}t)\sigma_x - \sin(\tilde{\omega}_{ss}t)\sigma_x]$$

with shifted frequencies $\tilde{\omega}_s=\omega_s-\omega_0$ and $\tilde{\omega}_{ss}=\omega_s+\omega_0$.

The dynamics under the Hamiltonian $H_I$ can be solved with the results above. If $\tilde{\omega}_b-\tilde{\omega}_s$, $\Omega_{b,s}\ll\tilde{\omega}_b$, $\tilde{\omega}_s$, $\tilde{\omega}_{ss}$, the mode dominating the system dynamics is the frequency difference $\tilde{\omega}_b-\tilde{\omega}_s$, yielding the effective Hamiltonian $$\overline{H}_I = \frac{\delta_z}{2}\sigma_z + \Omega_{Tx}\cos[(\omega_b-\omega_s)t]\sigma_z,$$

where the static AC stark shift due to both the bias and signal fields is $$\frac{\delta_z}{2} = -\frac{1}{4}\left[\frac{\Omega_b^2}{\tilde{\omega}_b}+\frac{\Omega_s^2}{\tilde{\omega}_s}-\frac{\Omega_s^2}{\tilde{\omega}_{ss}}\right]$$

and $\Omega_{Tx}$ is the target signal amplitude $$\Omega_{Tx} = \frac{\Omega_b\Omega_{sx}}{4}\left(\frac{1}{\omega_b-\omega_0}+\frac{1}{\omega_s-\omega_0}\right).$$

The initial transverse signal is converted to a longitudinal signal with a (lower) frequency $\omega_T=\omega_b-\omega_s$ and a reduced amplitude $\Omega_{Tx}$. While this effective target signal can be measured by the same rotating-frame Rabi protocol described above under a resonance condition $|\omega_b-\omega_s|=\Omega$, it also lends itself naturally to pulsed dynamical decoupling AC sensing methods. Pulsed dynamical decoupling sequences such as CPMG can be used to sense both longitudinal and transverse signals, where a series of $\pi$ pulses are applied periodically with an interval $\tau$ and only frequencies on-resonance with the pulse train lead to prominent state evolution. When $|\omega_b-\omega_s|=\pi/\tau$, the effective Hamiltonian $\overline{H}_I$ above is on-resonance with the CPMG sequence. Then the amplitude of the transverse component of the target signal can be obtained by measuring the population in initial state $|+\rangle$ as a function of the pulse number $N=t/\tau$, yielding $$S(t) = P_{|+\rangle}(t) = \frac{1}{2}\left[1 + \cos\left(\frac{4\Omega_{Tx}t}{\pi}\right)\right].$$

Sensitivity to Quantum Frequency-Mixed Signals

Protocols for arbitrary frequency (and direction) sensing should achieve an optimal sensitivity, which is the minimally detectable field change per unit time. The sensitivity $\eta$ to the signal amplitude, $\Omega_s$, is given by $\eta=\sigma_S\sqrt{t+t_d}/(dS/d\Omega_s)$, where $S(\Omega_s)$ is the measurement signal, $\sigma_S$ the signal uncertainty, and t and $t_d$ are the sensing time and sequence dead time, respectively. By a careful choice of initial state and control protocol, the signal can be written as $$S = \frac{1}{2}[1 + e^{-\chi}\cos(\epsilon\Omega_s t)],$$

where the factor $\chi$ is due to the signal decay and the factor $\epsilon$ sets the sensitivity degradation in comparison to typical protocols without frequency mixing. Both of these factors depend on the chosen protocol. TABLE 1 lists protocols for sensing transverse and longitudinal signals with quantum frequency mixing by different bias fields. Since the factor $\epsilon$ is proportional to the bias amplitude such that $\eta \propto 1/\Omega_b$, the sensitivity can be improved by increasing $\Omega_b$.

Figures 3A, 3B, 3C, 3D:
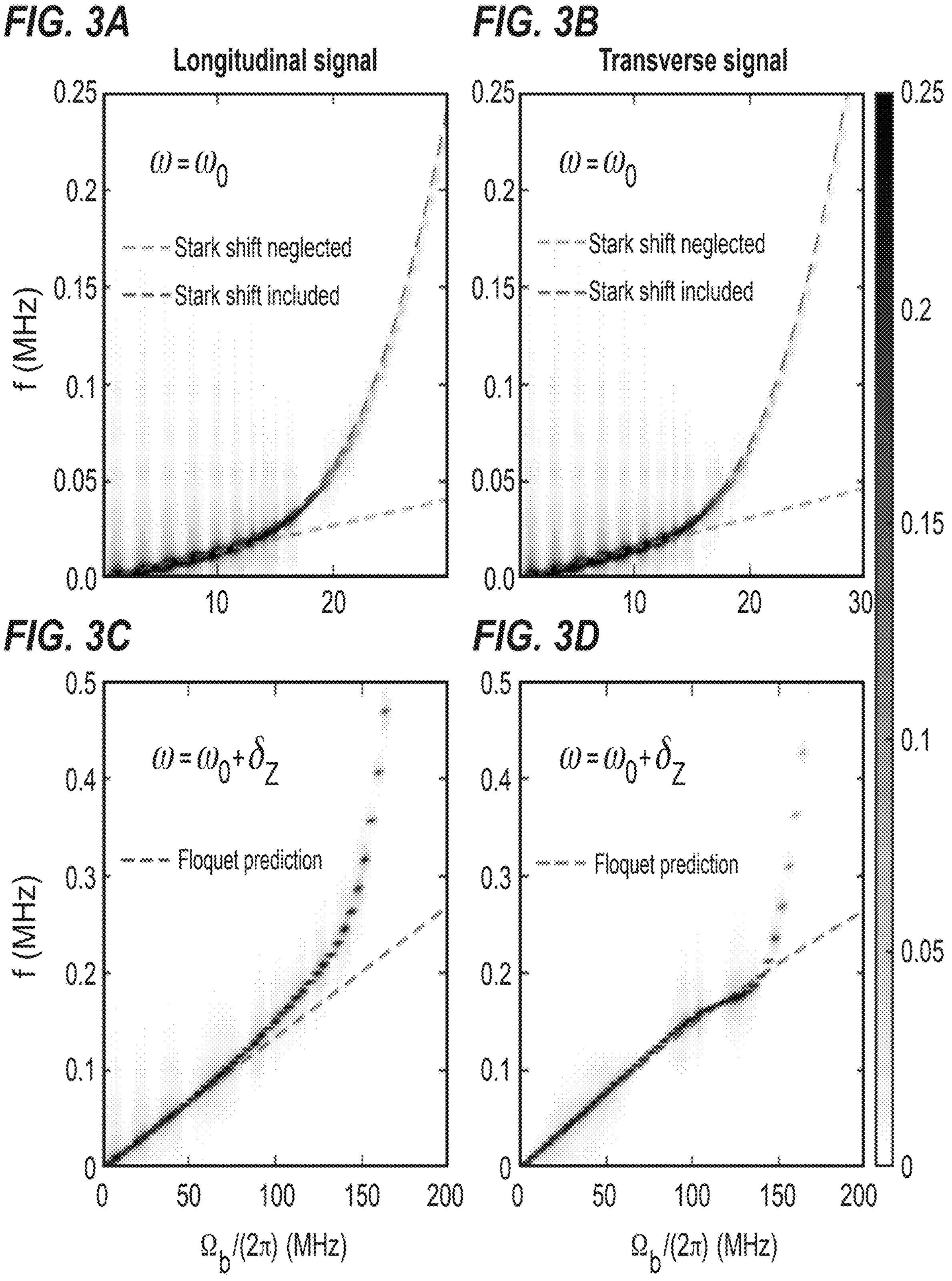
FIG. 3A is an intensity plot of the Fourier spectrum versus AC bias field amplitude for a simulated longitudinal Rabi signal sensed by a quantum frequency mixer.
FIG. 3B is an intensity plot of the Fourier spectrum versus AC bias field amplitude for a simulated transverse Rabi signal sensed by a quantum frequency mixer.
FIG. 3C is an intensity plot of the Fourier spectrum versus AC bias field amplitude (horizontal axis) for a simulated longitudinal Rabi signal with resonance correction for AC Stark shifts as sensed by a quantum frequency mixer.
FIG. 3D is an intensity plot of the Fourier spectrum versus AC bias field amplitude for a simulated transverse Rabi signal with resonance correction for AC Stark shifts as sensed by a quantum frequency mixer.

FIGS. 3A-3D illustrate simulated Fourier spectra and theoretical predictions (dashed lines) of the rotating-frame Rabi oscillations for the sensing of both longitudinal signals and transverse signals. FIGS. 3A and 3B are plots of the intensity of simulated Rabi spectra as a function of bias amplitude $\Omega_b$ for longitudinal and transverse signal sensing, respectively. In other words, FIGS. 3A and 3B show the intensity of the Fourier spectrum of the Rabi signal $P_{|+\rangle}$ (t) under different bias amplitudes $\Omega_b$. The signal frequency and bias frequencies are fixed at $\omega_s=(2\pi)375$ MHz and $\omega_b=\omega_s+\omega_0-\Omega$, respectively. The signal amplitudes for FIGS. 3A and 3B are $\Omega_{sz}=(2\pi)1$ MHz and $\Omega_{sx}=(2\pi)1$ MHz, respectively, and the spin-locking drive amplitude is $\Omega=(2\pi)3$ MHz for both plots. In FIG. 3A, the spin-locking drive frequency is on resonance with the qubit frequency $\omega=\omega_0=(2\pi)50$ MHz. In FIG. 3B, the resonance condition is $\omega_b=\omega_s+\Omega$.

When the bias amplitude $\Omega_b$ is small, the simulated results shown in FIGS. 3A and 3B match the linear dependence predicted by the theory with AC stark shift terms neglected. When $\Omega_b$ is large, the simulated Rabi frequency deviates from a linear dependence on $\Omega_b$ due to larger frequency detuning caused by the the AC Stark shifts, and the simulation matches the theoretical prediction when such shifts $\delta_z$ are considered. Thus, applying a larger bias amplitude for better sensitivity involves extending the linear region by compensating the AC Stark shift by tuning to the corrected resonance condition $\omega=\omega_0+\delta_z$, where $\delta_z=\delta_z(\omega)$ has a dependence on $\omega$ and the solution to $\omega$, $\delta_z$ can be obtained numerically for a given $\Omega_b$.

FIGS. 3C and 3D show simulated Rabi spectra intensity as a function of bias amplitude $\Omega_b$ for longitudinal and transverse signal sensing, respectively, with corrected resonance conditions. The parameters are the same as in the simulations for FIGS. 3A and 3B except for the frequency of the spin-locking drive $\omega=\omega_0+\delta_z$ and the resonance condition $\omega_b=\omega_s+\omega-\Omega$ for longitudinal signal, which cancels the AC Stark shift in the rotating frame. The linear region now extends to a larger value of $\Omega_b$ for both longitudinal and transverse signals, which demonstrates that a large bias amplitude almost on the order of $\omega_s$ improves the sensitivity. In principle, using more orders of the perturbation expansion yields better resonance corrections to expand the linear region further. However, when the value of $\Omega_b$ becomes even larger, the condition $\Omega_b \ll \tilde{\omega}_b=\omega_b-\omega$ is no longer satisfied, and the theory based on the perturbative Floquet approach starts to breakdown. Although it may be challenging to completely eliminate sensitivity degradation, the sensitivity of quantum frequency-mixing sensing protocols can approach the sensitivity of (conventional) sensing protocols without frequency mixing by increasing $\Omega_b$.

Arbitrary Frequency Vector Field Sensing

Combining the protocols given above for sensing transverse and longitudinal signals yields a method for sensing a vector AC field with an arbitrary frequency range. By applying a single bias field with tunable frequency $\omega_b$, the transverse and longitudinal components of a vector AC field can be measured separately under different resonance conditions through Rabi or CPMG methods. This protocol enables vector AC magnetometry in the high frequency range (e.g., larger than a few GHz) and also serves as an alternative to existing protocols in the intermediate frequency range (between 50 MHz and 2 GHz).

To see how this protocol enables vector AC magnetometry, consider a target signal in the form of a linearly polarized AC magnetic field that couples to a spin qubit in the lab frame as $$H_s = [\Omega_{s\perp}(\cos\theta\sigma_x + \sin\theta\sigma_y) + \Omega_{sz}\sigma_z]\cos(\omega_s t).$$

Figures 4A, 4B:
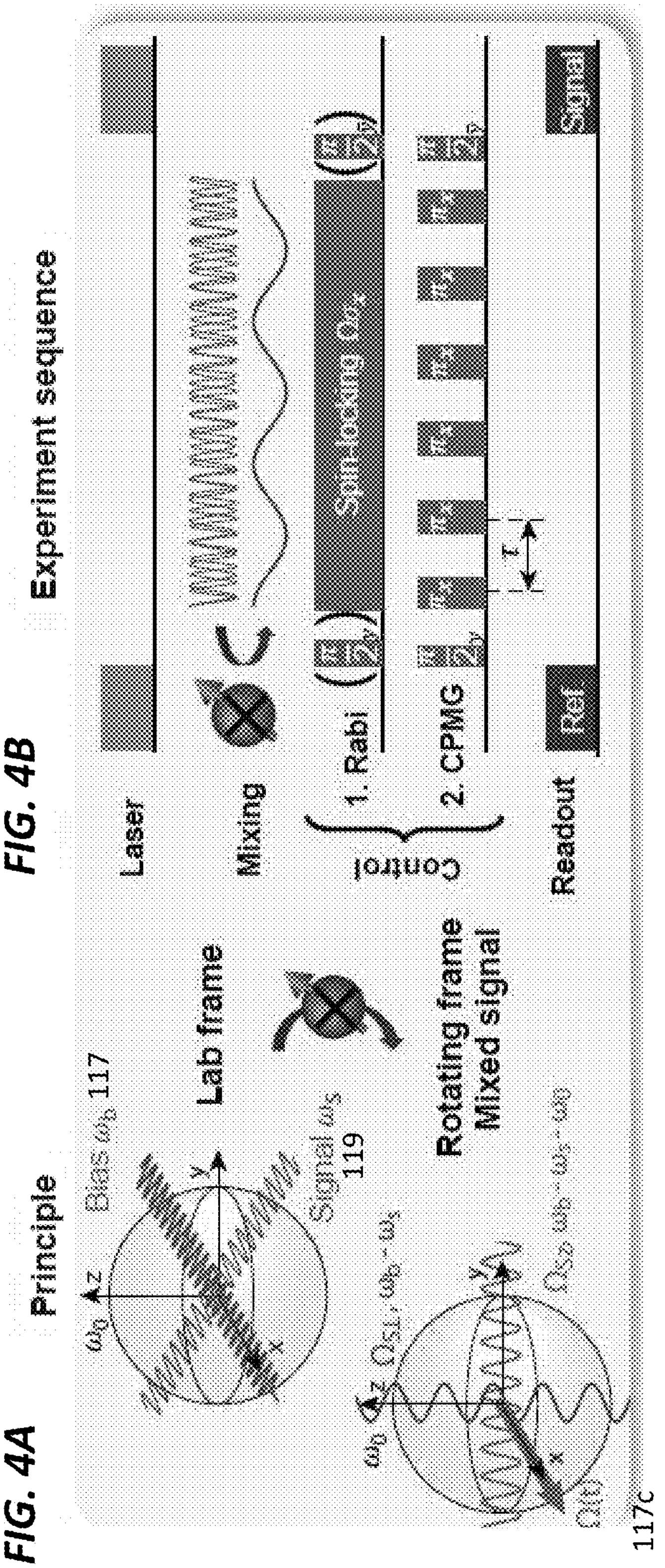
FIG. 4A illustrates principles of vector AC magnetometry with a quantum frequency mixer.
FIG. 4B illustrates an experimental pulse sequence for vector AC magnetometry with a quantum frequency mixer.

For a circularly polarized bias field in the x-y plane with phase $\phi_b$ relative to the signal phase, the effective Hamiltonian in the rotating frame is $$\overline{H}_I = \frac{\delta_z}{2}\sigma_z - \Omega_{T\perp}\cos(\omega_T t + \phi_b - \theta)\sigma_z + \Omega_{Tz}[\cos(\tilde{\omega}_T t + \phi_b)\sigma_x + \sin(\tilde{\omega}_T t + \phi_b)\sigma_y],$$

where $\omega_T=\omega_b-\omega_s$ and $\tilde{\omega}_T=(\omega_b-\omega_0)-\omega_s$, the AC Stark shift is $$\delta_z/2 = -(1/4)\left(\frac{\Omega_b^2}{\tilde{\omega}_b} + \frac{\Omega_{s\perp}^2}{\omega_T} - \Omega_{s\perp}^2/\tilde{\omega}_T\right)$$

and the effective target signal amplitudes $\Omega_{Tz}$, $\Omega_{T\perp}$ are of the same form given above for the target signal amplitudes $\Omega_{Tz}$, $\Omega_{Tx}$ (with $\Omega_{s\perp}$ replacing $\Omega_{sx}$). As quantum frequency mixing yields different frequencies and directions for the longitudinal and transverse components of the target signal, they can be detected independently under different resonance conditions. The sensing task is facilitated by applying a resonant control field $\Omega(t)$, either with the same antenna as the AC bias field or a different antenna, such that the Hamiltonian in the rotating frame approximately reduces to $$\overline{H}_I = \frac{\Omega(t)}{2}\sigma_x - \Omega_{T\perp}\cos(\omega_T t + \phi_b - \theta)\sigma_z + \Omega_{Tz}\sin(\tilde{\omega}_T t + \phi_b)\sigma_y,$$

as shown in FIG. 4A. The AC Stark shifts and the effective term along x can safely neglected. The control field amplitude is set to implement either a continuous sensing protocol or pulsed sensing protocol as shown in FIG. 4B.

Rabi Sensing Protocol: For continuous (Rabi) measurements, the control field is a continuous (static) field in the rotating frame, $\Omega(t)=\Omega$, and the bias frequency $\omega_b$ is tuned to sense the longitudinal and transverse components. When $\tilde{\omega}_T=\pm\Omega$, the longitudinal component (the $\sigma_y$ term proportional to $\Omega_{sz}$) is on-resonance, and the off-resonance transverse component can be neglected. Then $\Omega_{sz}$ can be obtained by measuring the rotating-frame Rabi oscillation of the initial spin-locked state $|+\rangle$. To sense the transverse field $\Omega_{s\perp}$ set $\omega_T=\pm\Omega$, so that the corresponding frequency-mixed term (the $\sigma_z$ term) is on-resonance and can induce a rotating-frame Rabi oscillation.

In addition to measuring the amplitudes $\Omega_{sz}$ and $\Omega_{s\perp}$, Rabi oscillations can also provide the transverse field direction $\theta$ by setting the initial state to $|0\rangle$ and controlling the bias field phase. Under the resonance condition for the longitudinal component $\tilde{\omega}_T=\pm\Omega$, the Rabi signal is then $S(t)=(½)[1\pm\sin(\Omega_{Tz}t)\sin(\phi_b)]$, which reveals the phase difference between signal and bias. With control over $\phi_b$, the transverse direction $\theta$ can then be measured under the resonance condition for the transverse component $\omega_T=\pm\Omega$, yielding a Rabi signal $S(t)=(½)[1\mp\sin(\Omega_{T\perp}t)\sin(\phi_b-\theta)]$.

Carr-Purcell-Meiboom-Gill (CPMG) Sensing Protocol: For a pulsed sensing protocol, $\Omega(t)$ is modulated by periodically applying $\pi$ pulses along the $\sigma_x$ direction, with an inter-pulse delay $\tau$. The bias frequency is set so that $\tilde{\omega}_T=\pm\pi/\tau$, the $\sigma_y$ term arising from the longitudinal field is on resonance with the CPMG sequence, and the transverse component can be neglected. Measuring the population of the initial state $|+\rangle$ as a function of the pulse number yields $S(t)=(½)[1+\cos(4\Omega_{Tz}/\pi)]$, which allows extraction of the longitudinal amplitude $\Omega_{sz}$. Performing the same experiment with $\omega_T=\pm\pi/\tau$, yields $S(t)=(½)[1+\cos(4\Omega_{T\perp}t\ \cos(\theta)/\pi)]$, where the on-resonance transverse field is kept and $\Omega_{s\perp}$ is extracted. $\theta$ (and the signal phase $\phi_s$, which is set to 0 here for simplicity) can be extracted by controlling the bias field phase. For both cases the measured signals depend on the relative phase $\phi_b$ and transverse direction of the target signal, $\theta$, which can then be obtained with control over $\phi_b$.

Many other sensing protocols could also be combined with quantum frequency mixing to broaden the range of accessible frequencies. For example, the Ramsey sequence could be utilized to probe an AC signal through the AC Stark shift. Other examples include correlation spectroscopy, quantum sensing assisted by a quantum memory, aperiodic decoupling sequences, etc. For example, a quantum mixer can be used with a synchronized readout technique to achieve arbitrary frequency resolution. A quantum mixer can be combined with a spin amplification technique to improve sensitivity. In sum, almost any quantum sensing technique can be used with our quantum mixer to extend its frequency range almost arbitrarily.

Example Experimental Vector AC Magnetometry

FIGS. 4A-4F illustrate arbitrary-frequency vector AC magnetometry with a slightly modified version of the quantum frequency mixing system 100 shown in FIG. 1C. In this modified quantum frequency mixing system, the AWG 110 has a third channel that acts as the signal source 118. The NV centers 132 have spin S=1 and provide sensitive magnetometry using optically detected magnetic resonance (ODMR) techniques as described above. The magnets 134*a* and 134*b* apply a static magnetic field $B_0\approx 239$ G along the NV axis to lift the degeneracy of the spin-1 ground states $|m_S=\pm1\rangle$. The two ground states $|m_S=0\rangle$ and $|m_S=-1\rangle$ are used as the logical $|0\rangle$ and $|1\rangle$ with an energy gap of 2200 MHz. The laser 150 emits a 0.4 W green laser beam, which is focused to a ~30 μm spot on the diamond 130 for polarization and fluorescence readout addressing $\sim10^{10}$ spins (NV centers 132) simultaneously. The loop structure 129 on the PCB 128 delivers linearly polarized bias field 117 and signal field 119 through the input channels 122 and 124. The three synchronized channels of the AWG 110 implement precise control over the bias 117 and signal 119. Since the bias 117 and signal 119 fields are applied by the same loop structure 129, $\Omega_{sy}$, $\theta\equiv0$.

FIG. 4A illustrates the linearly polarized bias 117 and signal 119 fields projected on the Bloch sphere in the lab frame of reference (top). FIG. 4A also shows the resonant control field, $\Omega(t)$, and the longitudinal and transverse amplitudes $\Omega_{sz}$ and $\Omega_{s\perp}$, respectively, of the mixed signal in the rotating frame of reference.

FIG. 4B shows the pulse sequences applied to the NV centers 132 for both Rabi and CPMG measurements. For both measurements, the laser 150 initialized the NV centers 132 with a pulse of green light (e.g., at a wavelength of 532 nm). This initialization pulse caused the NV centers 132 to emit an initial burst of fluorescent light, which served as a reference for the ODMR measurement. In both Rabi and CPMG measurements, the loop structure 129 applied a π/2 pulse generated by the control channel of the AWG 110 to the NV centers 132 after the photodetector 154 detected the initial burst of fluorescent light. Then the loop structure 129 applied the signal 119 being measured—here, a vector AC signal with frequency $\omega_s=(2\pi)150$ MHz—and the bias 117 with tunable frequency $\omega_b$ for quantum frequency mixing (protocols 1 and 3 in TABLE 1) to the NV centers 132. In addition to the signal and bias, the same loop structure 129 applies a control field 117*c*, which is a transverse AC field oscillating at the NV resonance frequency 2200 MHz. For the Rabi measurements, the control field 117*c* was continuous; for the CPMG measurements, the control field 117*c* was a series of Tr pulses. Rabi and CPMG measurements each ended with a π/2 pulse of the control field 117*c*, before a final laser pulse that elicited another pulse of fluorescence from the NV centers 132. This pulse encoded information about the signal field 119.

Figure 4C:
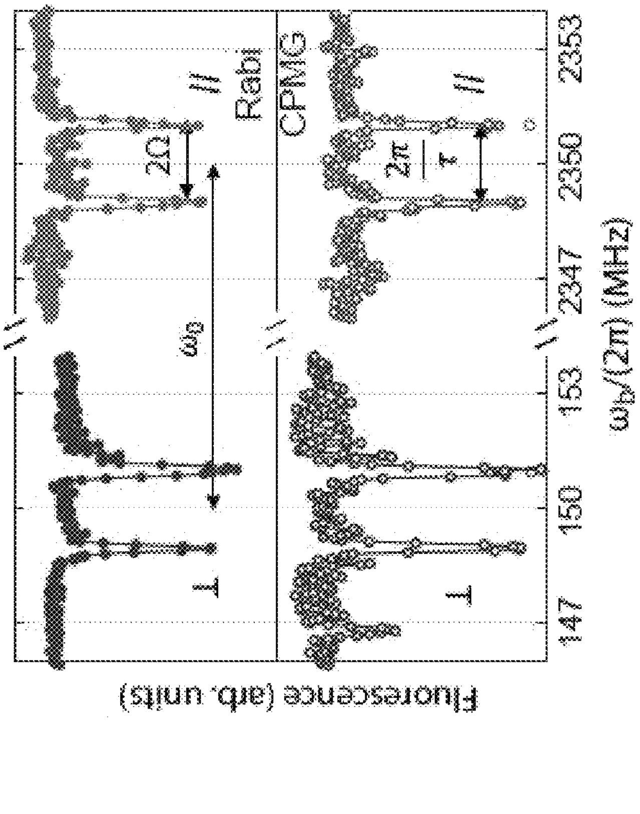
FIG. 4C shows plots of ESR measurements made with a quantum frequency mixer.
Figure 4D:
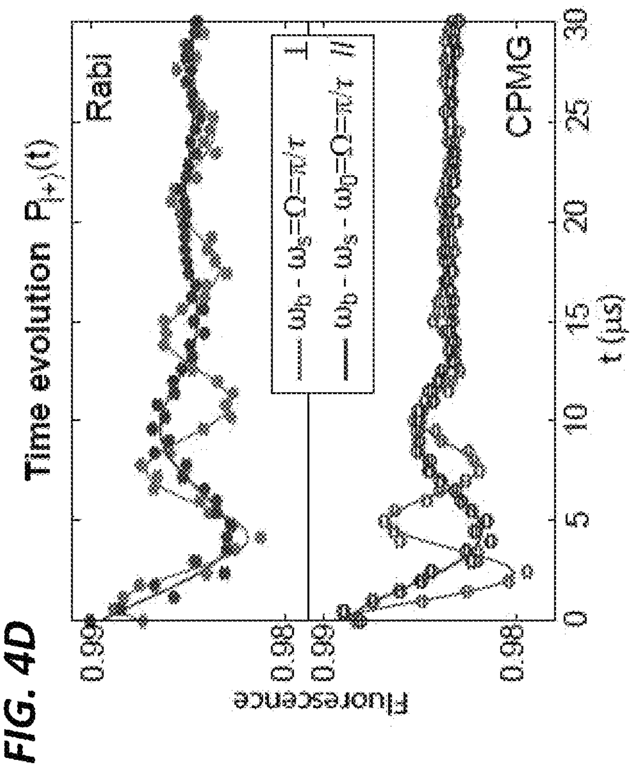
FIG. 4D is a plot of the fluorescence time evolution under resonant conditions measured with a quantum frequency mixer.

FIGS. 4C and 4D show ESR measurements and time evolution measurements under resonance conditions, respectively. In FIG. 4C, sweeping the bias frequency for both the Rabi and CPMG methods reveals resonances at $\omega_b=\omega_s\pm\Omega$ (π/τ) and $\Omega_b=\omega_s+\omega_0\pm\Omega$ (π/τ), corresponding to the transverse and longitudinal components of the signal field. FIG. 4D shows the on-resonance time evolution for both components. For both measurements, the initialization and readout state is $|+\rangle$. The control fields are set to $\Omega$, $\pi/\tau=(2\pi)1$ MHz and the π pulse length for CPMG is 0.167 μs. A linearly polarized signal field with frequency $\omega_S=(2\pi)$ 150 MHz, phase $\phi_s=0$, amplitude $\Omega_{sx}=(2\pi)15.3$ MHz, $\Omega_{sz}=(2\pi)10.4$ MHz was applied as the target to be sensed. A bias field with tunable frequency $\omega_b$ was applied with amplitudes $\Omega_b=(2\pi)15.3$ MHz for the low frequency range to sense the transverse signal and $\Omega_b=(2\pi)3$ MHz for the high frequency range to sense the longitudinal signal. For the Rabi method, the evolution duration was set to 3.5 μs (4 μs) for the low (high) frequency range, while for the CPMG method the pulse number is set to 6 (8) for low (high) frequency range. For the time evolution measurement in FIG. 4D, the data is fit to the function $S(t)=c_0+0.5c\cos(\Omega_T t)\exp(-t/T_{2\rho\rho})+\xi t$ where $T_{2\rho\rho}$ is the coherence time and $\xi$ is a phenomenological drift factor.

Figure 4E:
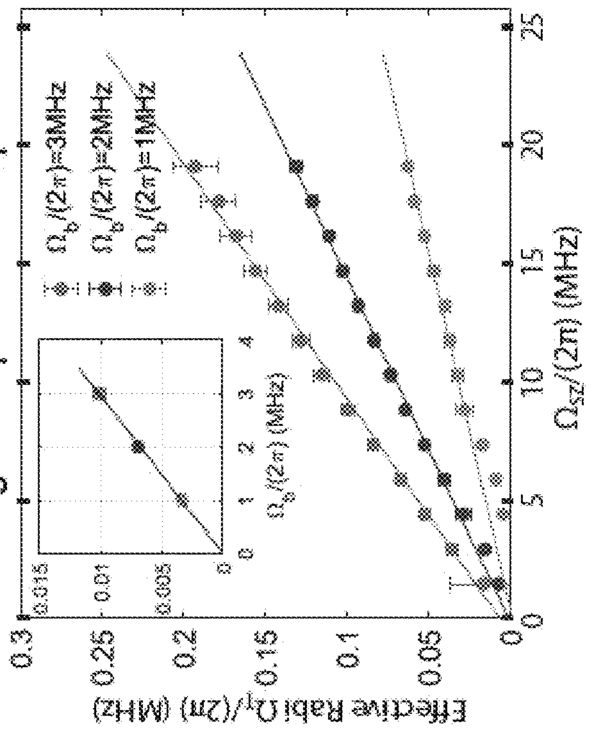
FIG. 4E is a plot of the effective Rabi frequency $\Omega_T$ versus the signal amplitude $\Omega_{sz}$ under different AC bias field amplitude ($\Omega_b$) conditions as measured with a quantum frequency mixer.

FIG. 4E shows the signal amplitude sweep under different bias amplitudes and confirms the linear dependence of the measured effective amplitudes $\Omega_{Tz}$, $\Omega_{Tx}$ on the signal and bias amplitudes. The Rabi frequency for the longitudinal component sensing was measured as a function of signal amplitude under three different bias field amplitudes. The slopes for the signal sweep under different bias amplitudes are plotted in the inset of FIG. 4E and fit to a linear trend. Due to large error bars (not shown) for ultra-slow Rabi oscillation measurements, the first two (three) data points for $\Omega_b/(2\pi)=2(1)$ MHz are not included when fitting the linear curve.

Figure 4F:
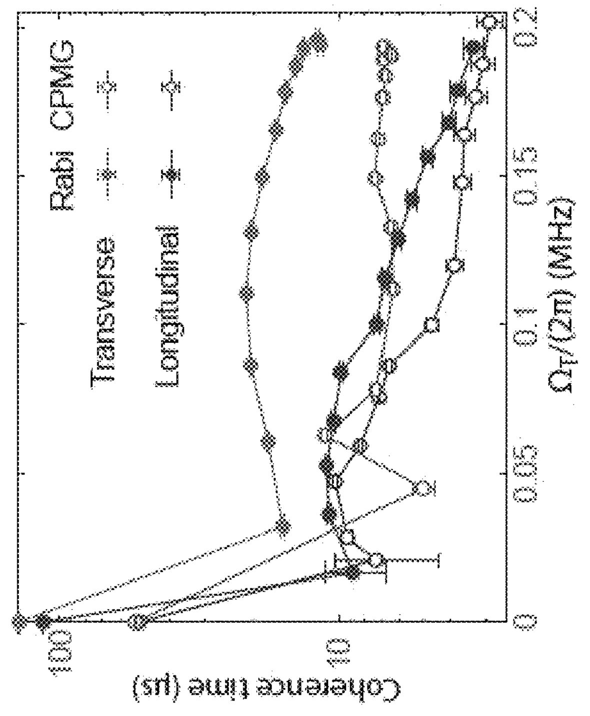
FIG. 4F is a plot of coherence time as a function of the effective Rabi frequency $\Omega_T$ measured with a quantum frequency mixer.

FIG. 4F is a plot of the measured coherence time $T_{2\rho\rho}$. The time evolution induced by the effective transverse and longitudinal signal were measured in the rotating frame. The signal amplitude was swept while the other experimental parameters were the same as the time evolution measurement in FIG. 4D.

The Rabi data in FIG. 4D can be used to estimate the sensitivities $\eta_z$, $\eta_x$ for the longitudinal and transverse components, $$\eta_z = \frac{4\sigma_S\sqrt{t+t_d}}{c\epsilon_z\gamma_e t e^{-t/T_{2\rho\rho}}} \approx 7.2\frac{\mu T}{\sqrt{\mathrm{Hz}}},\ \eta_x = \frac{2\sqrt{2}\,\sigma_S\sqrt{t+t_d}}{c\epsilon_x\gamma_e t e^{-t/T_{2\rho\rho}}} \approx 7.6\frac{\mu T}{\sqrt{\mathrm{Hz}}}$$

where for the calculation of $\eta_z$, $\eta_x$, the following specific parameters in this experiment are taken into account: $\sigma_S\approx0.0094$, 0.0095, signal contrast $c\approx0.01$, 0.008, and coherence time $T_{2\rho\rho}\approx7.5$, 16.2 μs are from the data fitting, and the sensitivity reduction factors $\epsilon_{z,x}\approx0.01$, 0.016, the sensing time and dead time t, $t_d$=10, 50 μs for both cases.

The ultimate projection-noise limit of the sensitivity $\eta\propto1/\sqrt{t}$ is set by the coherence time of the signal-induced oscillation in the rotating frame, denoted by $T_{2\rho\rho}$. The upper limit of $T_{2\rho\rho}$ is given by the coherence time $T_{1\rho}$ of the state $|+\rangle$ in the absence of signal fields, which is the spin-locked state for Rabi sensing or optimally protected state for CPMG. Theoretically, these coherence times are associated with the power spectral density (PSD) of stochastic magnetic fields due to various noise sources.

The coherence time of the rotating-frame Rabi oscillation can be written as $$\frac{1}{T_{2\rho\rho}} \approx \frac{1}{4}\mathcal{S}_{\Omega_T}(0) + \frac{1}{8}\mathcal{S}_{\Omega}(\Omega_T) + \frac{3}{4}\mathcal{S}_z(\Omega) + \frac{5}{8}\mathcal{S}_x(\omega_0)$$

where $\mathcal{S}_j$ are the noise spectra with $j=x,z,\Omega,\Omega_T$ denoting the noise of the transverse and longitudinal spin bath fields, spin-locking drive field, and the effective target signal field, respectively. FIG. 4F shows $T_{2\rho\rho}$ as a function of the state oscillation frequency measured by sweeping the signal amplitudes $\Omega_s$. The non-monotonic behavior can be explained by the presence of two competing noise terms, $\mathcal{S}_{\Omega_T}(0)$, which increases as $\Omega_T$ and $\mathcal{S}_{\Omega}(\Omega_T)$, which decreases as $\Omega_T$. Here, the noise is assumed to be dominated by static and low frequency components such as driving field inhomogeneities. However, under ideal conditions when all control and bias fields are noiseless such that $\mathcal{S}_{\Omega_T}=\mathcal{S}_{\Omega}=0$, and $\mathcal{S}_x(\omega_0)\sim1/T_1$ is small, the dominant term is should be $\mathcal{S}_z(\Omega)\sim1/T_{1\rho}$, which sets the limit of the coherence time to the spin-locking coherence $T_{1\rho}$. For the measurement depicted in FIG. 4F, the spin-locking coherence time approaches a time scale greater than 100 μs for the resonant driving amplitude $\Omega=(2\pi)1$ MHz. Further optimizations, such as improving the photon collection efficiency, can improve the sensitivity and bring it closer to the best performances reported for other sensing protocols, with only a reduction factor $\epsilon_{x,z}$ difference.

FIG. 4F shows that the coherence time for sensing a transverse component is better than for sensing a longitudinal component, and that the Rabi method provides longer coherence times than CPMG. Although dynamical decoupling, in particular the pulsed CPMG protocol, can filter out static resonance shifts and inhomogeneities (mainly $\sigma_z$ terms), the cancellation tends to be better when the effective target signal Hamiltonian commutes with $\sigma_z$. Since quantum frequency mixing down-converts a stochastic AC signal (term $\mathcal{S}_{\Omega_T}(0)$) in the same way as a coherent signal, it enables noise spectroscopy measurements with an arbitrary frequency range.

The bias field amplitude and polarization can each be chosen to offset degradation in sensitivity to the signal field, which may have more of an effect at higher signal frequencies. For example, for a transverse signal field, choosing a longitudinal or circularly polarized transverse bias field improves the sensitivity by a factor of about $\omega_s/\omega_0$ compared to a linearly polarized transverse bias field. Moreover, the protocols disclosed here use a single orientation of NV centers and can therefore be implemented on single-NV center sensors, allowing for nanoscale spatial resolution. Thus, quantum frequency mixing enables a quantum sensor with an arbitrary frequency range, which can be combined with other state-of-the-art techniques to achieve high sensitivity, nanoscale resolution, arbitrary frequency resolution, and k-space resolution.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of measuring an alternating current (AC) signal field oscillating at a signal frequency $\omega_s$ with a quantum system having a resonance associated with a transition of the quantum system between a first quantum state and a second quantum state and centered at a resonance frequency $\omega_0$, the method comprising:

initializing the quantum system to the first quantum state;

applying the AC signal field to the quantum system;

while applying the AC signal field to the quantum system, applying an AC bias field to the quantum system, the AC bias field oscillating at a bias frequency $\omega_b$ selected based on the signal frequency and the resonance frequency, the quantum system mixing the AC signal field with the AC bias field to produce a target field having a spectral component oscillating at the resonance frequency, the target field changing a population of the first quantum state;

measuring the population of the first quantum state; and determining an amplitude of the AC signal field based on the population of the first quantum state.

2. The method of claim 1, wherein $|\omega_0-\omega_s|$ is greater than a linewidth of the resonance.

3. The method of claim 1, wherein the AC signal field is longitudinally polarized and the AC bias field is transversely polarized.

4. The method of claim 1, wherein the AC signal field is transversely polarized and the AC bias field is transversely polarized.

5. The method of claim 1, wherein the AC signal field is transversely polarized and the AC bias field is longitudinally polarized.

6. The method of claim 1, wherein the quantum system comprises a spin defect center, initializing the spin defect center to the first quantum state comprises optically pumping the spin defect center, and measuring the population of the first quantum state comprises detecting fluorescence emitted by the spin defect center.

7. The method of claim 6, wherein the spin defect center is a nitrogen vacancy center in diamond and the signal frequency is between about 50 MHz and about 2 GHz.

8. The method of claim 1, wherein measuring the population of the first quantum state comprises detecting a Rabi oscillation of the quantum system.

9. The method of claim 1, further comprising:

applying a control field oscillating at the resonance frequency to the quantum system while applying the AC signal field to the quantum system and applying the AC bias field to the quantum system.

10. A system for measuring an alternating current (AC) signal field oscillating at a signal frequency $\omega_s$, the system comprising:

a quantum system having a resonance associated with a transition of the quantum system between a first quantum state and a second quantum state and centered at a resonance frequency $\omega_0$;

a bias field source to generate an AC bias field oscillating at a bias frequency $\omega_b$ selected based on the signal frequency and the resonance frequency;

an antenna, in electromagnetic communication with the quantum system and operably coupled to the bias field source, to apply the AC bias field to the quantum system while the quantum system is subject to the AC signal field such that the quantum system mixes the AC signal field with the AC bias field to produce a target field having a spectral component oscillating at the resonance frequency;

a detector, in electromagnetic communication with the quantum system, to sense a change in a population of the first quantum state caused by the target field; and a processor, operably coupled to the detector, to determine an amplitude of the AC signal field based on the population of the first quantum state.

11. The system of claim 10, wherein the quantum system comprises a spin defect center.

12. The system of claim 11, wherein the detector comprises a photodetector configured to detect fluorescence emitted by the spin defect center at an amplitude proportional to the population of the first quantum state.

13. The system of claim 11, further comprising:

an optical pump source, in optical communication with the spin defect center, to illuminate the spin defect center with an optical pulse selected to initialize the population of the first quantum state.

14. The system of claim 11 wherein the spin defect center is a nitrogen vacancy center in diamond and the signal frequency is between about 50 MHz and about 2 GHz.

15. The system of claim 10, wherein $|\omega_0-\omega_s|$ is greater than a linewidth of the resonance.

16. The system of claim 10, wherein the AC signal field is longitudinally polarized and the AC bias field is transversely polarized.

17. The system of claim 10, wherein the AC signal field is transversely polarized and the AC bias field is transversely polarized.

18. The system of claim 10, wherein the AC signal field is transversely polarized and the AC bias field is longitudinally polarized.

* * * * *